United States Patent [19]
Watanabe et al.

[11] Patent Number: 5,178,231
[45] Date of Patent: Jan. 12, 1993

[54] DIFFERENTIAL CONTROL SYSTEM FOR FOUR-WHEEL DRIVE VEHICLE

[75] Inventors: Kenichi Watanabe; Eizi Nishimura; Kaoru Sotoyama; Mitsuru Nagaoka; Osamu Kameda, all of Hiroshima, Japan

[73] Assignee: Mazda Motor Corporation, Hiroshima, Japan

[21] Appl. No.: 643,238

[22] Filed: Jan. 18, 1991

[30] Foreign Application Priority Data

Jan. 19, 1990 [JP] Japan .................. 2-11058

[51] Int. Cl.⁵ .................. B60K 17/34; B60K 17/348
[52] U.S. Cl. .................. 180/248; 180/197
[58] Field of Search .............. 180/248, 233, 247, 249, 180/197

[56] References Cited

U.S. PATENT DOCUMENTS

| | | | |
|---|---|---|---|
| 4,809,807 | 3/1989 | Leiber | 180/248 |
| 4,896,738 | 1/1990 | Kodama | 180/247 |
| 4,936,406 | 6/1990 | Tezuka et al. | 180/249 |
| 4,953,654 | 9/1990 | Imaseki et al. | 180/249 |
| 4,961,476 | 10/1990 | Witte et al. | 180/247 |
| 4,967,869 | 11/1990 | Nagaoka et al. | 180/197 |
| 5,010,974 | 4/1991 | Matsuda | 180/247 |
| 5,014,809 | 5/1991 | Matsuda | 180/248 |
| 5,017,183 | 5/1991 | Teraoka | 180/248 |
| 5,018,596 | 5/1991 | Kodama | 180/248 |
| 5,033,002 | 7/1991 | Sol | 180/197 |

FOREIGN PATENT DOCUMENTS

| | | |
|---|---|---|
| 0311140 | 4/1989 | European Pat. Off. . |
| 0314453 | 5/1989 | European Pat. Off. . |
| 3720459 | 12/1987 | Fed. Rep. of Germany . |
| 3721628 | 1/1988 | Fed. Rep. of Germany . |
| 0336055 | 10/1989 | Fed. Rep. of Germany . |
| 62-166113 | 7/1987 | Japan . |
| 62-261538 | 11/1987 | Japan . |
| 63-96938 | 6/1988 | Japan . |
| 2192160 | 1/1988 | United Kingdom . |

Primary Examiner—Mitchell J. Hill
Attorney, Agent, or Firm—Sixbey, Friedman, Leedom & Ferguson

[57] ABSTRACT

A four-wheel drive vehicle has a center differential which transmits the output torque of a power plant to both front and rear wheels in such a manner as to permit the front and rear wheels to rotate at different speeds. A differential control system has a differential rotation limit member which acts on the center differential to limit differential rotation of the front and rear wheels to a degree which is determined according to the difference in rotational speed between the front and rear wheels. The degree of limitation on the differential rotation of the wheels is determined according to the difference in rotational speed between the front and rear wheels based on first characteristics when the rotational speed of the front wheels is higher than that of the rear wheels and based on second characteristics when the rotational speed of the rear wheels is higher than that of the front wheels. The first and second characteristics are set separately from each other.

8 Claims, 17 Drawing Sheets

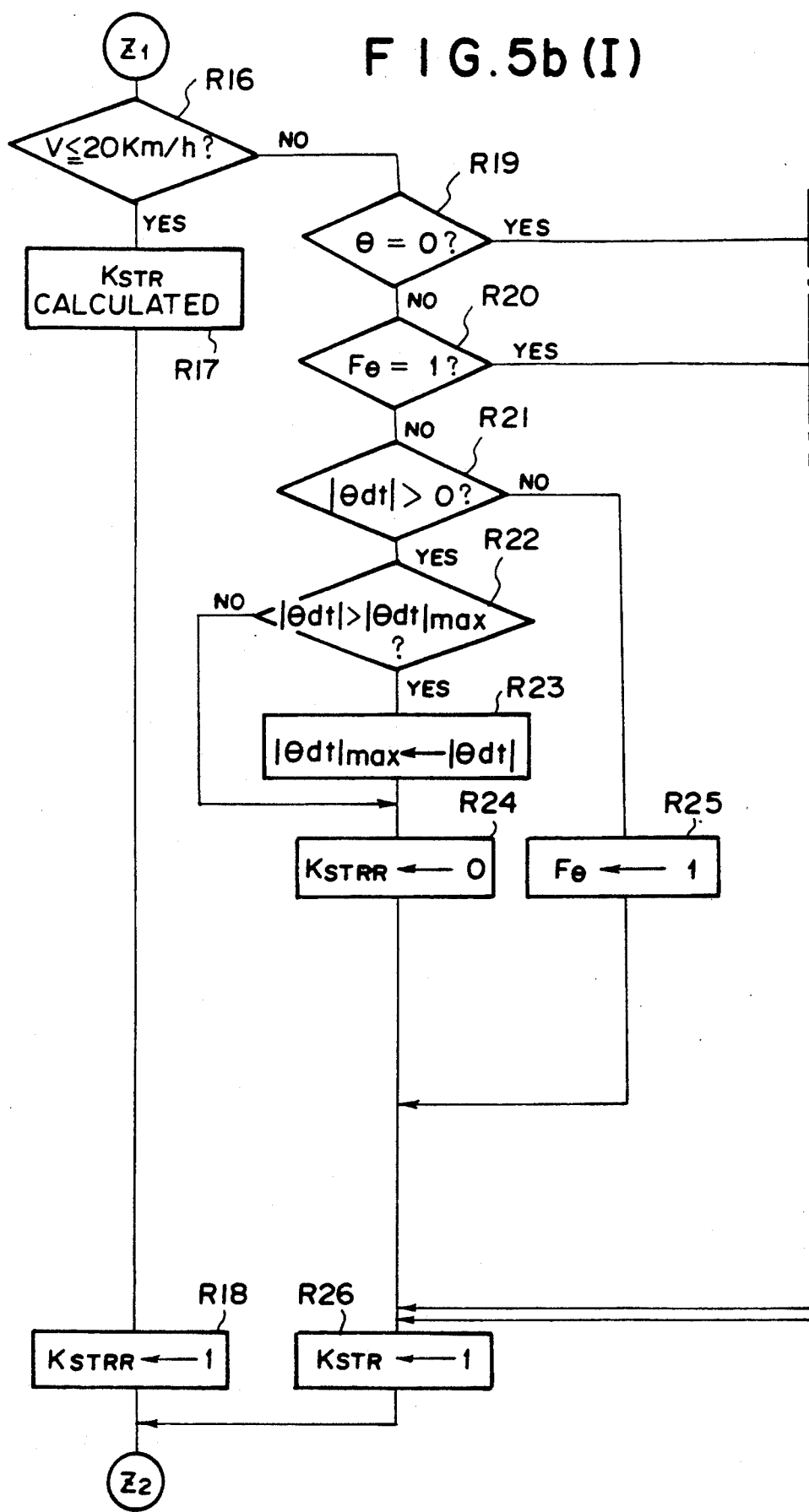

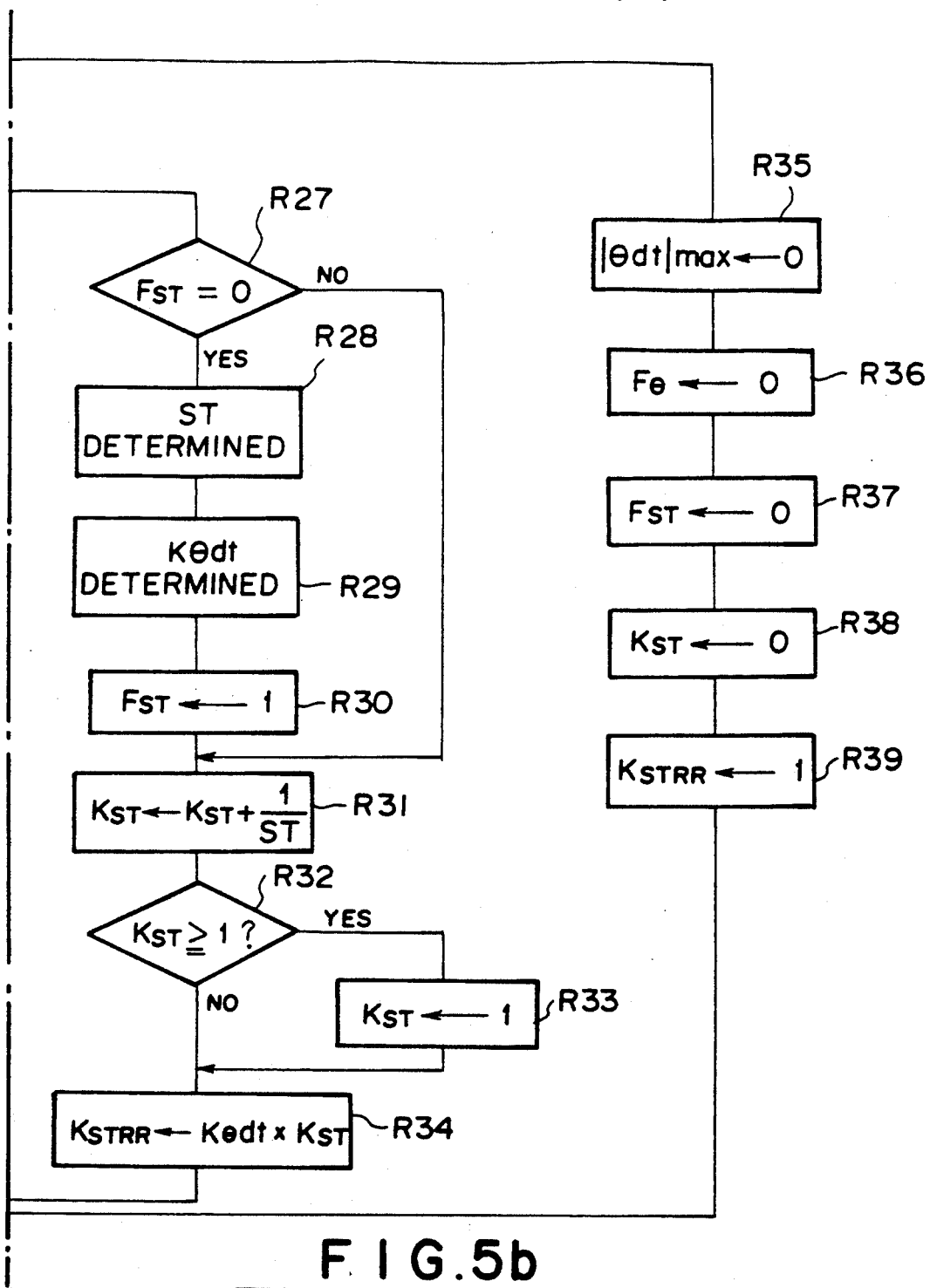
FIG. 5b(II)

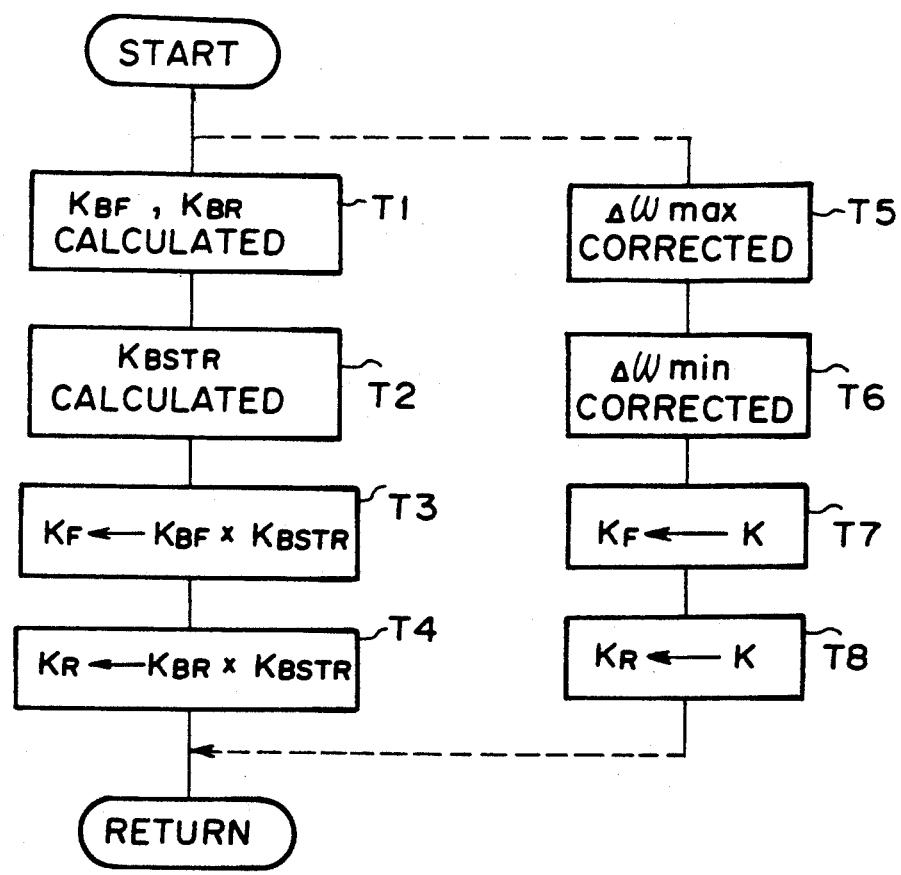
F I G.7

F I G. 16
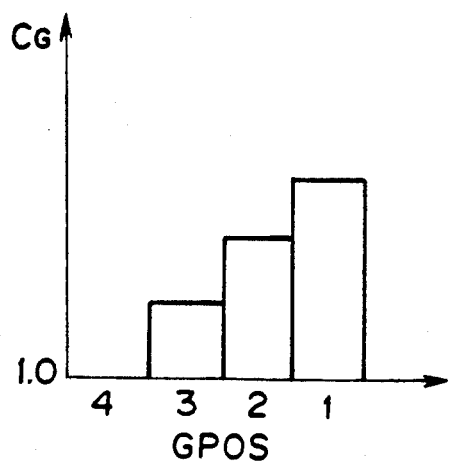
F I G. 17
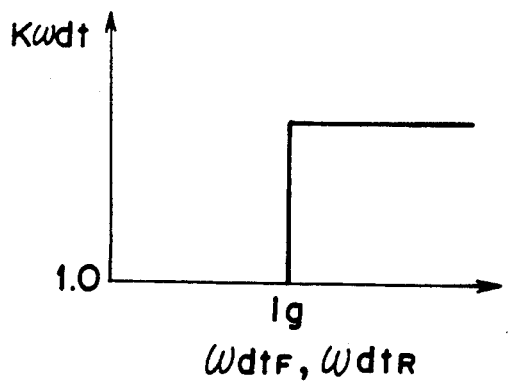
F I G. 18
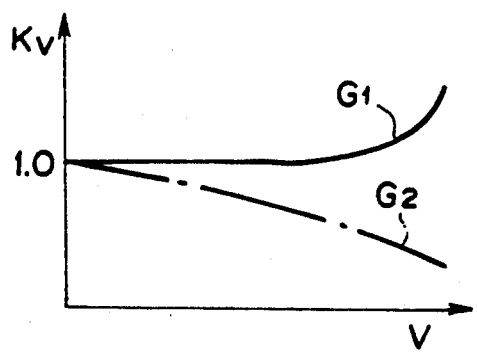
F I G. 19
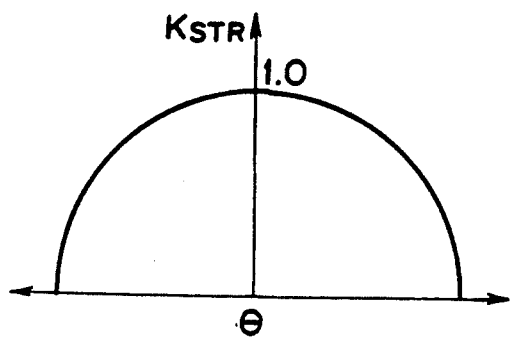

DIFFERENTIAL CONTROL SYSTEM FOR FOUR-WHEEL DRIVE VEHICLE

BACKGROUND OF THE INVENTION

1. Field of the Invention

This invention relates to a differential control system for a four-wheel drive vehicle.

2. Description of the Prior Art

There has been put into practice a four-wheel drive vehicle in which the output torque of a power train is transmitted to both the front wheels and rear wheels.

Generally the rear wheels turns on smaller radii than the front wheels when the vehicle is making a turn, and accordingly, the front wheels must rotate faster than the rear wheels. Accordingly, if the output shaft of the power train is rigidly geared to both the front wheels and rear wheels, the rotational speeds of the front wheels become equal to those of the rear wheels and a so-called tight corner braking phenomenon occurs.

In order to avoid the tight corner braking phenomenon, a center differential which transmits the output torque of the power train to both the front and rear wheels in such a manner as to permit the front and rear wheels to rotate at different speeds is provided between the power train and the front and rear wheels.

However, when one of the front wheels and the rear wheels are slipping in the vehicle provided with such a center differential, the major part of the torque is delivered to the other wheels and the driving force is substantially lost. Thus, there has been proposed a differential control system in which the center differential is prevented from functioning by mechanically connecting the front and rear wheels, for instance, by way of gears when the difference between the rotational speeds of the front and rear wheels is large.

However, in the conventional differential control system, the center differential is either permitted to function or prevented from functioning, and it is impossible to control the operating condition of the center differential according to the degree of slip of the wheels.

Accordingly, there has been proposed a differential control system in which a differential rotation limit means such as a wet clutch is provided between the front drive shaft and the rear drive shaft to cause them to engage with each other at a desired degree of engagement or between the input shaft of the center differential and one of the front and rear drive shaft to cause them to engage with each other at a desired degree of engagement, and the degree of engagement is controlled according to the difference between the rotational speeds of the front and rear wheels, i.e., the degree of slip, thereby limiting the differential rotation of the front and rear wheels. (See Japanese Unexamined Utility Model Publication No. 63(1988)-96938)

However, the differential control system disclosed in the above identified utility model publication is disadvantageous in that since it controls the differential rotation of the front and rear wheels simply according to the difference between the rotational speeds of the front and rear wheels, it cannot stabilize running of the vehicle according to various running conditions of the vehicle.

SUMMARY OF THE INVENTION

In view of the foregoing observations and description, the primary object of the present invention is to provide a differential control system for a four-wheel drive vehicle which can stabilize running of the vehicle according to various running conditions of the vehicle.

In accordance with the present invention there is provided a differential control system for a four-wheel drive vehicle having a center differential which transmits the output torque of a power plant to both front and rear wheels in such a manner as to permit the front and rear wheels to rotate at different speeds, said differential control system comprising a differential rotation limit means which acts on the center differential to limit differential rotation of the front and rear wheels to a degree which is determined according to the difference in rotational speed between the front and rear wheels characterized in that the degree of limitation on the differential rotation of the wheels is determined according to the difference in rotational speed between the front and rear wheels based on first characteristics when the rotational speed of the front wheels is higher than that of the rear wheels and based on second characteristics when the rotational speed of the rear wheels is higher than that of the front wheels, the first and second characteristics being set separately from each other.

Generally, the condition for stabilizing running of a vehicle changes according whether the rotational speed of the front wheels is higher than that of the rear wheels or the latter is higher than the former due to difference in the running condition between the front and rear wheels.

For example, load distribution to the front wheels generally differs from that to the rear wheels, and the wheels whose load distribution is smaller than the other are more apt to slip. Accordingly, by separately setting the first and second characteristics according to the weight distribution to the front and rear wheels, slip of the wheels whose load distribution is smaller than the other can be effectively prevented, thereby improving running stability of the vehicle.

When the vehicle is accelerated, the load on the front wheels is reduced and the front wheels becomes apt to slip. On the other hand, when the vehicle is decelerated, the load on the rear wheels is reduced and the rear wheels becomes apt to slip. Accordingly, by separately setting the first and second characteristics according to acceleration and deceleration of the vehicle, slip of the front or rear wheels during acceleration or deceleration of the vehicle can be effectively prevented.

When the vehicle is ascending a slope, the load on the front wheels is reduced and the front wheels becomes apt to slip. On the other hand, when the vehicle is descending a slope, the load on the rear wheels is reduced and the rear wheels becomes apt to slip. Accordingly, by separately setting the first and second characteristics according to the inclination of slope which the vehicle is ascending or descending, slip of the front or rear wheels during ascent or descent can be effectively prevented.

Generally, when the vehicle is making a turn, the turning radius of the rear wheels becomes smaller than the turning radius of the front wheels and the rotational speed of the rear wheels abruptly decreases, and as a result, the rear wheels becomes apt to slip. Accordingly, by separately setting the first and second characteristics according the steering angle, slip of the rear wheels during cornering can be effectively prevented. Further, by separately setting the first and second characteristics according to the rate of change with time of the steering angle, slip of the rear wheels during cornering can be effectively prevented.

When the vehicle is being braked, the load on the rear wheels is reduced, and the rear wheels becomes apt to lock. Accordingly, by separately setting the first and second characteristics according to the braking force, locking of the rear wheels during braking can be effectively prevented.

BRIEF DESCRIPTION OF THE DRAWINGS

FIGS. 5a to 5c are flow chart of the control routine for the normal running period, FIG. 7 is a flow chart of the routine for normal braking period control, FIG. 16 is a view showing the relation between the gear position correction value and the gear position of the automatic transmission, FIG. 17 is a view showing the relation between the wheel acceleration correction value and the acceleration of the wheels, FIG. 18 is a view showing the relation between the speed correction term and the vehicle speed, FIG. 19 is a view showing the relation between the steering angle correction term and the steering angle.

DESCRIPTION OF THE PREFERRED EMBODIMENT

Figure 1:
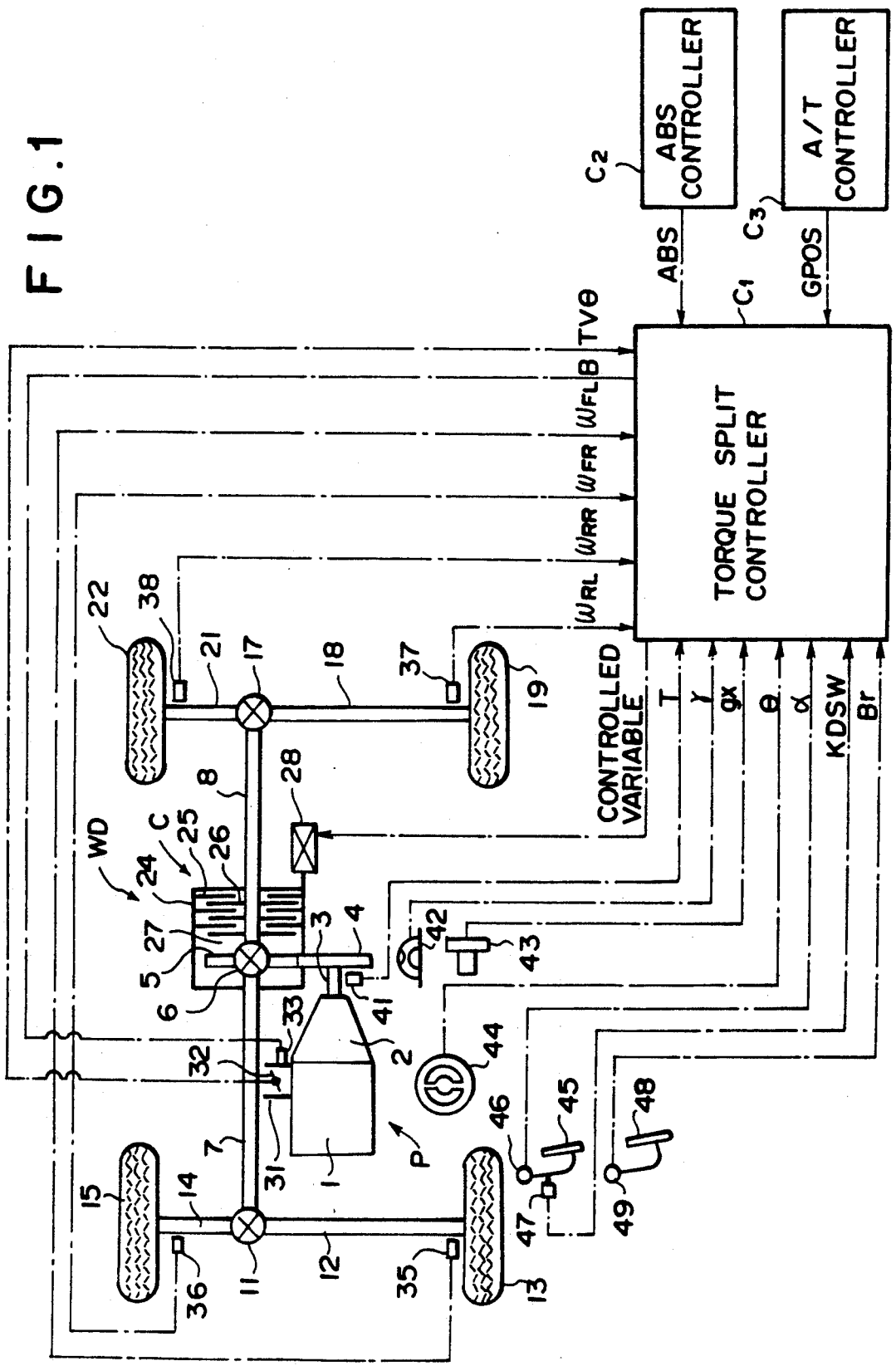
FIG. 1 is a schematic view showing a four-wheel drive vehicle provided with a differential control system in accordance with an embodiment of the present invention.

In FIG. 1, a four-wheel drive vehicle WD has a power plant P which is substantially comprises an engine 1 and an automatic transmission 2. The output torque of the power plant P is transmitted to a center differential 6 by way of a driving gear 4 mounted on the output shaft 3 of the power plant P and a driven gear 5 in mesh with the driving gear 4. The torque input into the center differential 6 is distributed to the front drive shaft 7 and the rear drive shaft 8. Though not shown in detail, the center differential 6 is of a well known type and comprises an input gear connected to the driven gear 5, a first output gear connected to the front drive shaft 7 and a second output gear connected to the rear drive shaft 8, the first and second output gears being engaged with each other to be able to rotate at different speeds.

The torque transmitted to the front drive shaft 7 is input into a front differential 11 and then transmitted to left and right front wheels 13 and 15 respectively by way of left and right front axles 12 and 14. The torque transmitted to the rear drive shaft 8 is input into a rear differential 17 and then transmitted to left and right rear wheels 19 and 22 respectively by way of left and right rear axles 18 and 21.

The front differential 11 is of a well known type which permits the left and right front wheels 13 and 15 to rotate at different speeds, and the rear differential 17 is of a well known type which permits the left and right rear wheels 19 and 22 to rotate at different speeds.

When one of the front and rear wheels 13 and 15 slip while the center differential 6 is allowed to freely function, the major part of the torque input into the center differential 6 is transmitted to the slipping wheels and almost no torque is transmitted to the other wheels, whereby the driving force is substantially lost. In order to avoid this, there is provided a wet clutch C which limits the differential function of the center differential 6 according to various running conditions of the vehicle WD. The wet clutch C comprises a cylinder member 24 fixed to the front drive shaft 7, a plurality of thin ring plates 25 mounted on the inner surface of the cylinder member 24 and a plurality of thin disk plates 26 fixed to the outer surface of the rear drive shaft 8 in the cylinder member 24. The ring plates 25 and the disk plates 26 are alternately arranged in the longitudinal direction of the drive shafts 7 and 8 in the inner space 27 of the cylinder member 24. The inner space 27 is filled with oil, and the hydraulic pressure in the inner space 27 is controlled by an hydraulic pressure control valve 28 which is controlled by a signal from a torque split controller C1. The higher the hydraulic pressure in the inner space 27 is, the stronger the ring plates 25 and the disk plates 26 are frictionally engaged with each other. That is, as the hydraulic pressure in the inner space 27 increases, the effect of the center differential 6 on the difference between the rotational speeds of the front drive shaft 7 and the rear drive shaft 8 becomes less. In this specification, "to limit the differential rotation" should be interpreted to "reduce the effect of the center differential 6 on the difference between the rotational speeds of the front drive shaft 7 and the rear drive shaft 8".

The torque split controller C1 is a digital controller formed of a microcomputer. A throttle position sensor (not shown) detects the opening TV$\theta$ of a throttle valve 32 provided in an intake passage 31, a boost sensor 33 provided in the intake passage 31 detects the boost (intake negative pressure) B, a first rotational speed sensor 35 detects the rotational speed $\omega$FL of the left front wheel by way of the rotational speed of the left front axle 12, a second rotational speed sensor 36 detects the rotational speed $\omega$FR of the right front wheel by way of the rotational speed of the right front axle 14, a third rotational speed sensor 37 detects the rotational speed $\omega$RL of the left rear wheel by way of the rotational speed of the left rear axle 18, a fourth rotational speed sensor 38 detects the rotational speed $\omega$RR of the right rear wheel by way of the rotational speed of the right rear axle 21, a torque sensor 41 detects the output torque T transmitted to the output shaft 3 of the power plant P, an inclination angle sensor 42 detects the inclination angle $\gamma$ of the road surface, an acceleration sensor 43 detects the longitudinal acceleration gx of the vehicle WD, a steering angle sensor 44 detects the steering angle $\theta$, an accelerator position sensor 46 detects the amount of depression u of an accelerator pedal 45, and a brake position sensor 49 detects the amount of depression Br of a brake pedal 48. These sensors input output signals into the torque split controller C1. Further, a kick-down switch 47 inputs a kick-down signal KDSW into the torque split controller C1, an ABS controller C2 for controlling an anti-lock brake system inputs an ABS signal ABS (which indicates that the ABS system is operating) into the torque split controller C1 and an automatic transmission controller C3 for controlling the automatic transmission 2 inputs a gear position signal GPOS (which represents the gear speed in which the automatic transmission is) into the torque split controller C1. Based on these signals, the torque split controller C1 controls the hydraulic pressure in the inner space 27 to control the degree of limitation on the differential rotation of the front and rear drive shafts 7 and 8 according to the running conditions of the vehicle WD, thereby improving the running stability of the vehicle WD, the fuel economy and the like.

The control of the degree of limitation on the differential rotation executed by the torque split controller C1 will be described with reference to the flow charts shown in FIGS. 2 to 8, hereinbelow.

Figure 2:
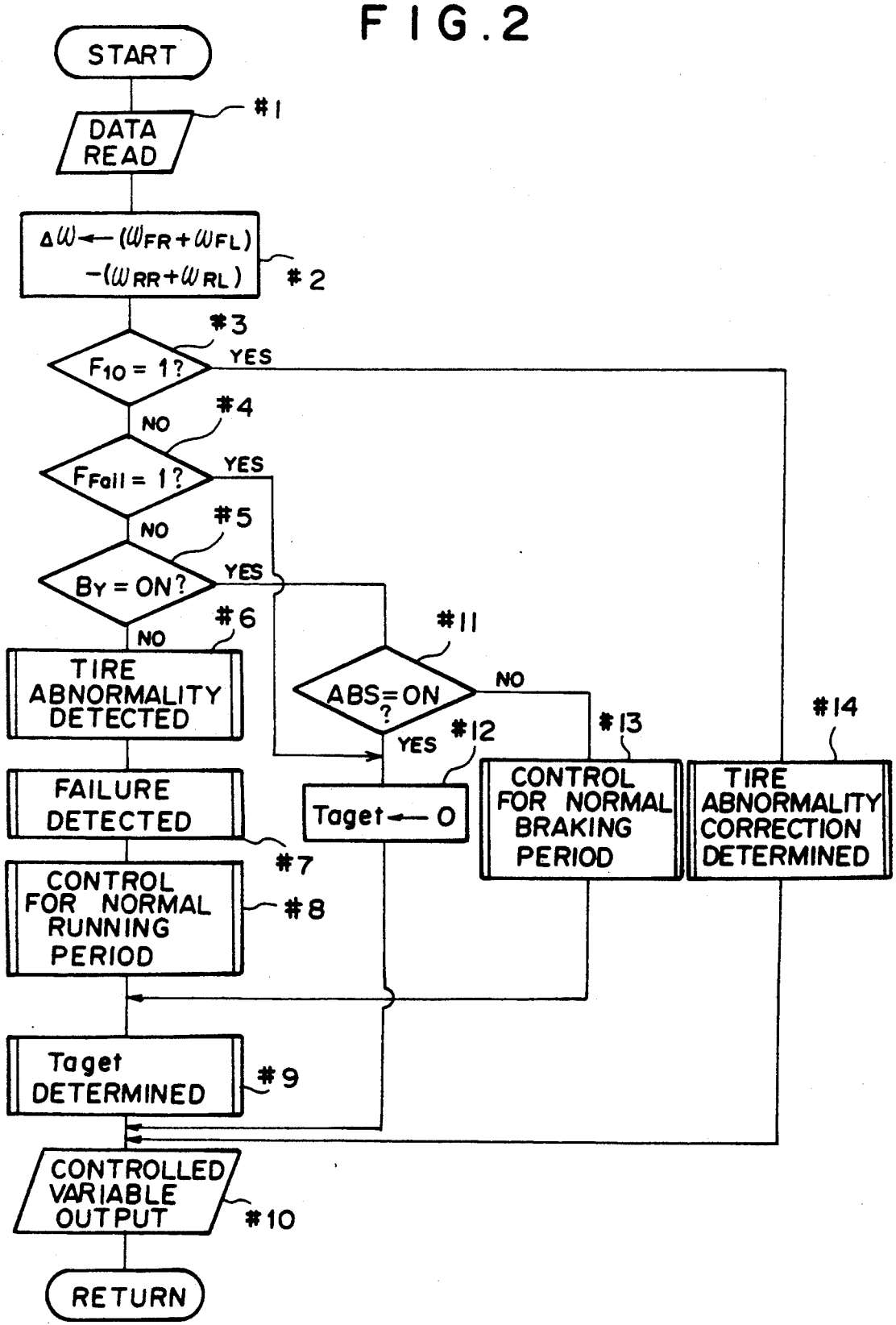
FIG. 2 shows a flow chart of the main routine for the control of the degree of limitation on the differential rotation executed by the torque split controller.

In the main routine shown in FIG. 2, the torque split controller C1 first reads the following data.
rotational speed of the left front wheel: $\omega$FL
rotational speed of the right front wheel: $\omega$FR
rotational speed of the left rear wheel: $\omega$RL
rotational speed of the right rear wheel: $\omega$RR
inclination angle of the road surface: $\gamma$
longitudinal acceleration of the vehicle: gx steering angle: $\theta$
amount of depression of the accelerator pedal: $\alpha$
throttle opening: TV$\theta$
boost: B
power plant output torque: T
kick-down signal: KDSW
amount of depression of the brake pedal: Br
ABS signal: ABS Then the torque split controller C1 differentiates these data with respect to time and obtains the following data.
left front wheel acceleration: $\omega_{dt}$FL
right front wheel acceleration: $\omega_{dt}$FR
left rear wheel acceleration: $\omega_{dt}$RL
right rear wheel acceleration: $\omega_{dt}$RR
rate of depression of the accelerator pedal: $\alpha_{dt}$ (Step #1)

Then in step #2, the torque split controller C1 calculates difference in rotational speed $\Delta\omega$ which is defined by the following formula (1).

$$\Delta\omega=(\omega FL+\omega FR)-(\omega RL+\omega RR) \qquad (1)$$

In step #3, the torque split controller C1 determines whether tire abnormality flag F10 is 1. The tire abnormality flag F10 is initialized to 0 and is set to 1 when abnormality of tires is found through a tire abnormality detecting routine which is executed in step #6 as will be described later. The tire abnormality flag F10 is reset to 0 when it is determined that the abnormality of tires has been corrected through a tire abnormality correction determining routine which is executed in step #14.

When it is determined in step #3 that the tire abnormality flag F10 is 1, the torque split controller C1 skips to step #14 and determines whether the abnormality of tires has been corrected. After step #14, the torque split controller C1 proceeds to step #10 and outputs a controlled variable which corresponds to a target value Taget of the degree of limitation on the differential rotation. Thereafter the torque split controller C1 returns to step #1. The "degree of limitation on the differential rotation" will abbreviated as "degree of limitation", hereinbelow.

On the other hand when it is determined in step step #3 that the tire abnormality flag F10 is not 1, i.e., F10=0, the torque split controller C1 proceeds to step #4 and determines whether fail flag F$_{Fail}$ is 1. The fail flag F$_{Fail}$ is initialized to 0 and is set to 1 when failure in the differential control system is found through a failure detecting routine which is executed in step #7 as will be described later.

When it is determined in step #4 that the fail flag F$_{Fail}$ is 1, i.e., that the differential control system has failed, the torque split controller C1 skips to step #12 and sets the target value Taget of the degree of limitation to 0. That is, the torque split controller C1 permits the center differential 6 to freely function to cause the front and rear wheels to rotate at different speeds without limitation, thereby preventing abnormal control of the degree of limitation. Then the torque split controller C1 outputs in step #10 a controlled variable corresponding to the target value Taget (=0), and returns to step #1.

On the other hand, when it is determined in step #4 that the fail flag $F_{Fail}$ is not 1, the torque split controller C1 proceeds to step #5 and determines whether the amount of depression Br of the brake pedal is larger than play (Br is ON). When it is determined in step #5 that Br is not ON, that is, when braking effect is not acting on the vehicle WD, the torque split controller C1 executes a control routine for the normal running period (corresponding to step #8) after executing the routines corresponding to steps #6 and #7.

Figure 3:
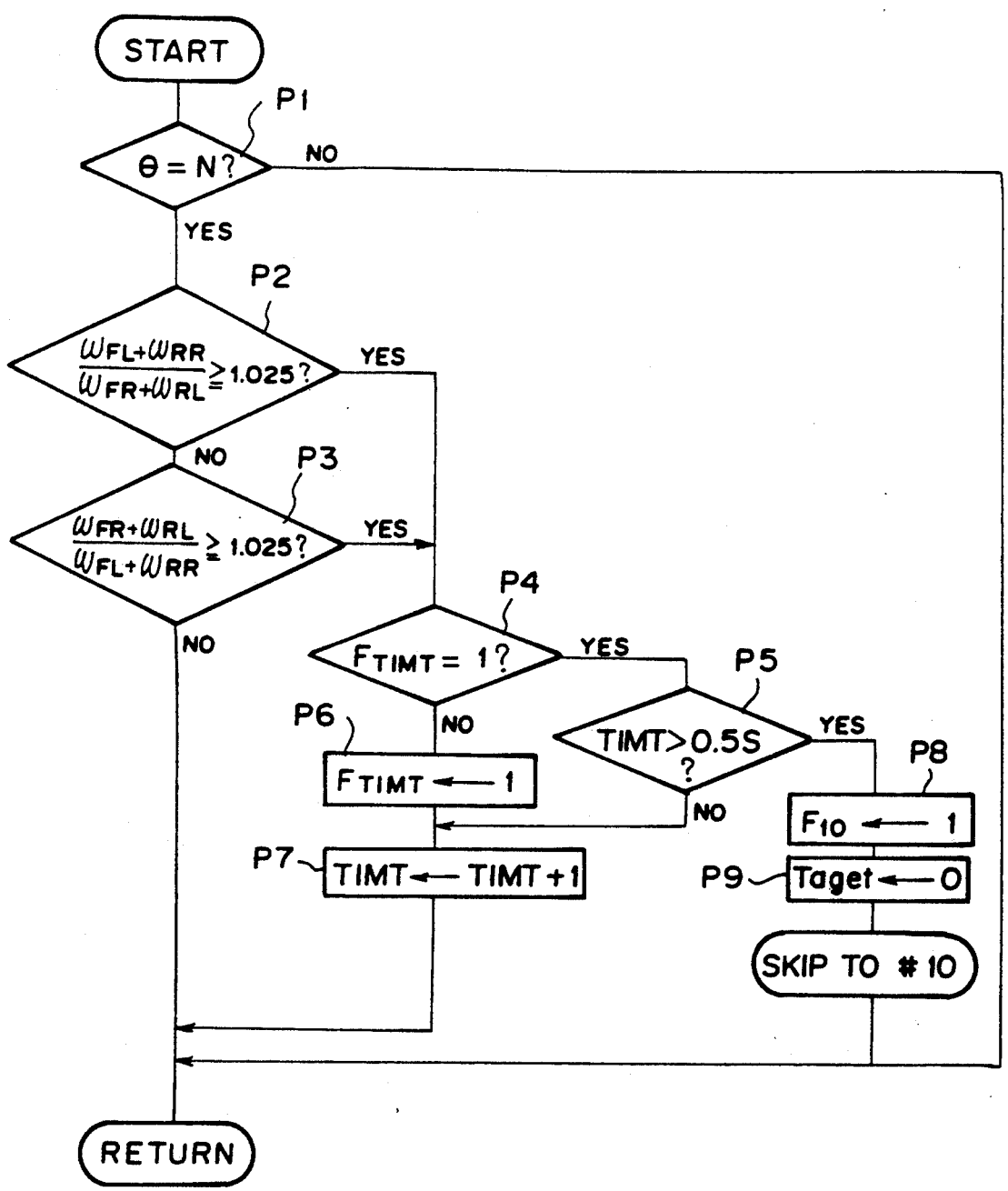
FIG. 3 is a flow chart of the tire abnormality detecting routine.

In step #6, the torque split controller C1 executes the tire abnormality detecting routine shown in FIG. 3 in which it is determined whether any tire is in abnormal state as will be described later.

Figure 4:
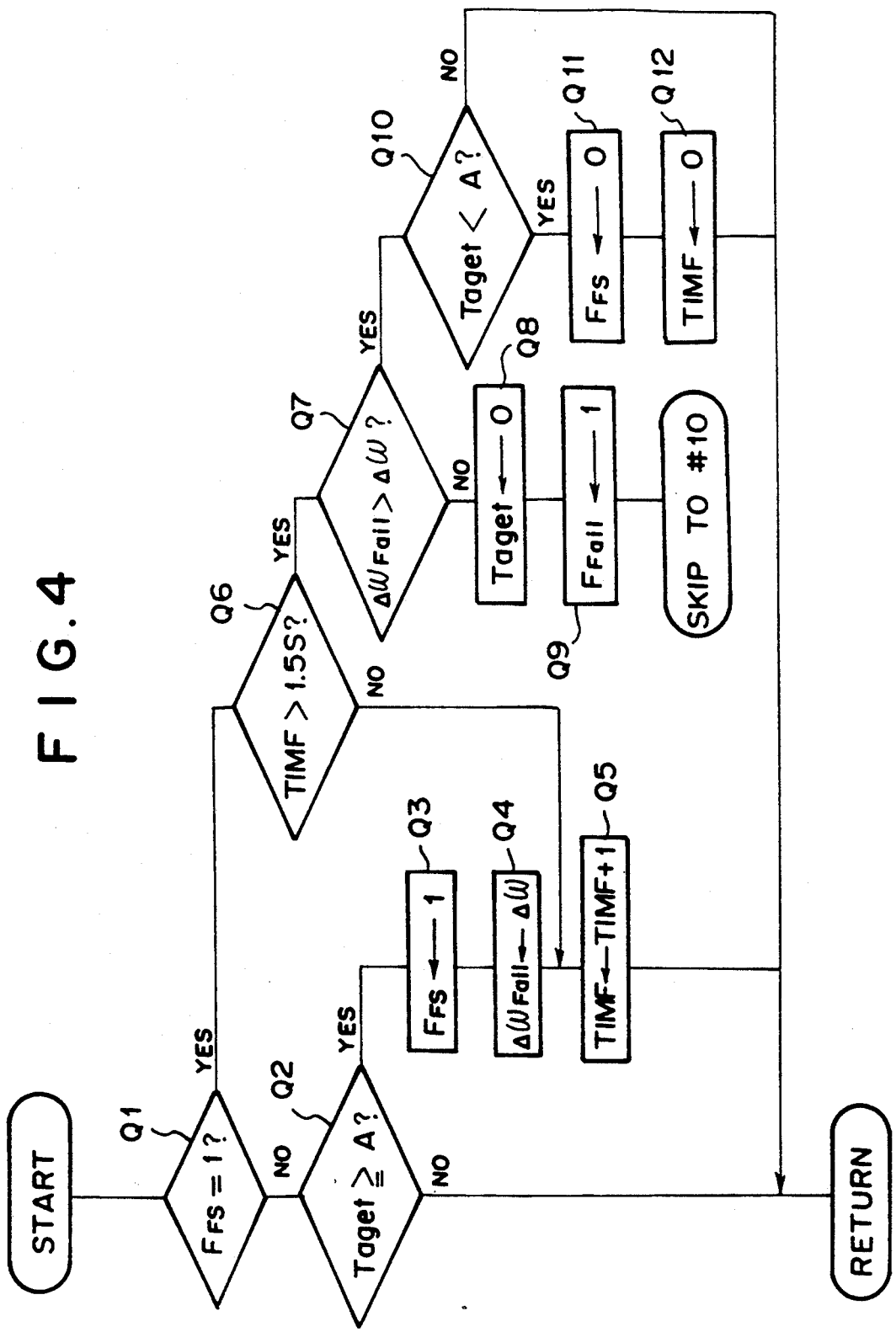
FIG. 4 is a flow chart of the fail detecting routine.

In step #7, the torque split controller C1 executes the failure detecting routine shown in FIG. 4 in which it is determined whether the differential control system has failed as will be described later.

Figure 5A:
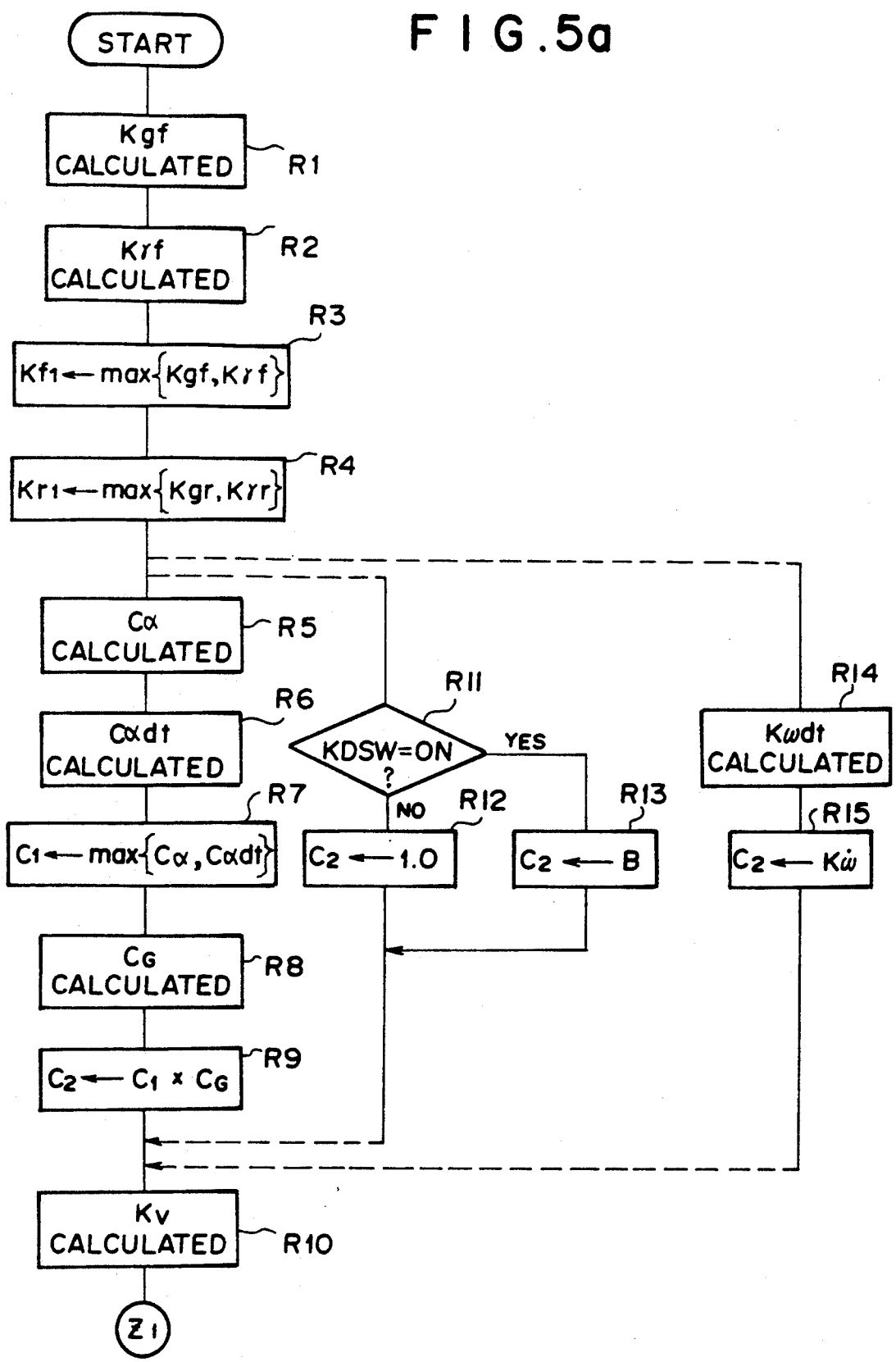
Figure 5C:
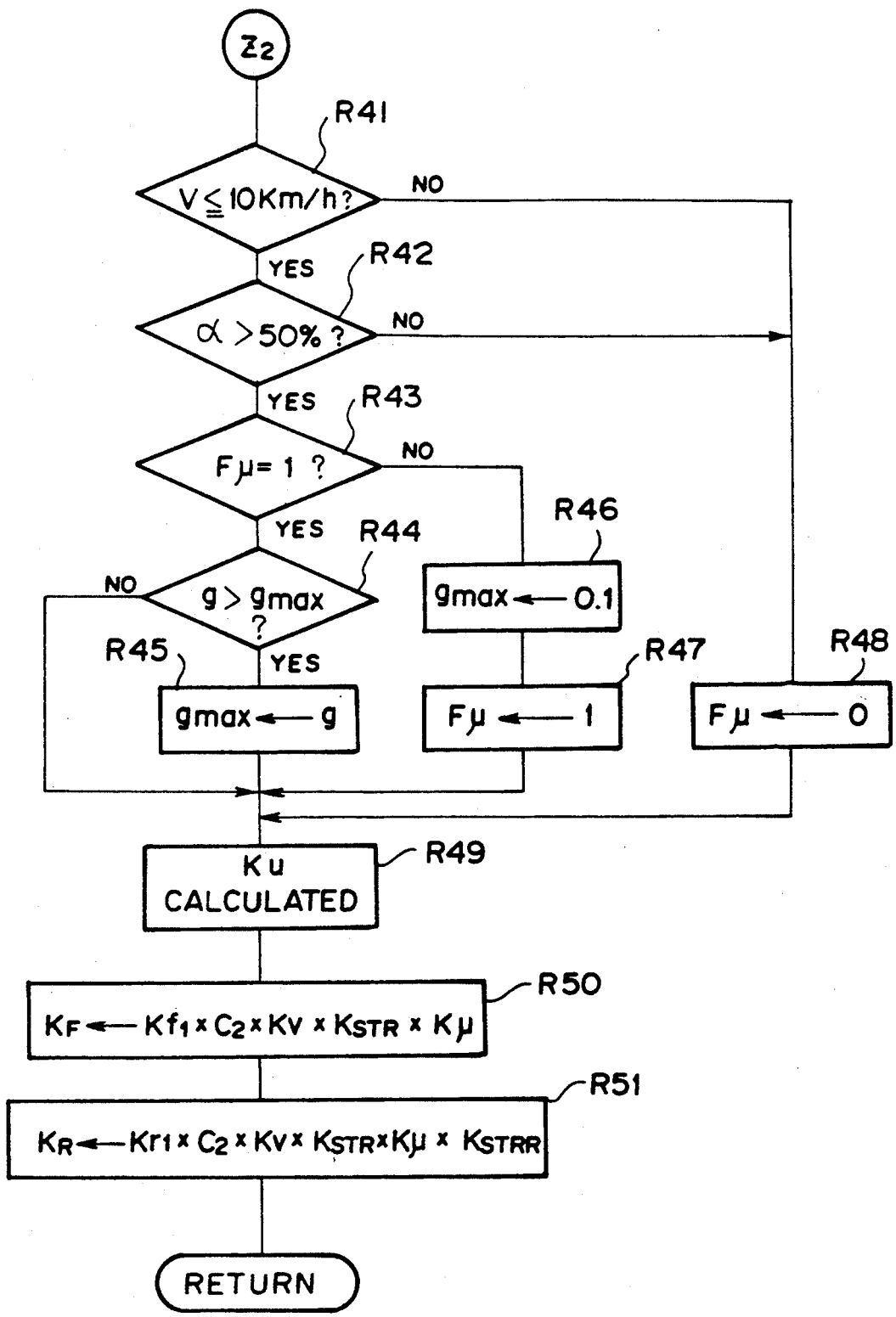

In step #8, the torque split controller C1 executes the control routine for normal running period shown in FIGS. 5a to 5c in which the torque split controller C1 calculates a gain $K_F$ which is used when the rotational speed of the front wheels is higher than that of the rear wheels (the difference in rotational speed $\Delta\omega > 0$) during the normal running of the vehicle (when braking effect is not acting on the vehicle WD) and a gain $K_R$ which is used when the rotational speed of the rear wheels is higher than that of the front wheels (the difference in rotational speed $\Delta\omega < 0$) during the normal running of the vehicle. The former gain will be referred to as "the front-higher gain $K_F$" and the latter gain will be referred to as "the rear-higher gain $K_R$", hereinbelow.

Figure 6:
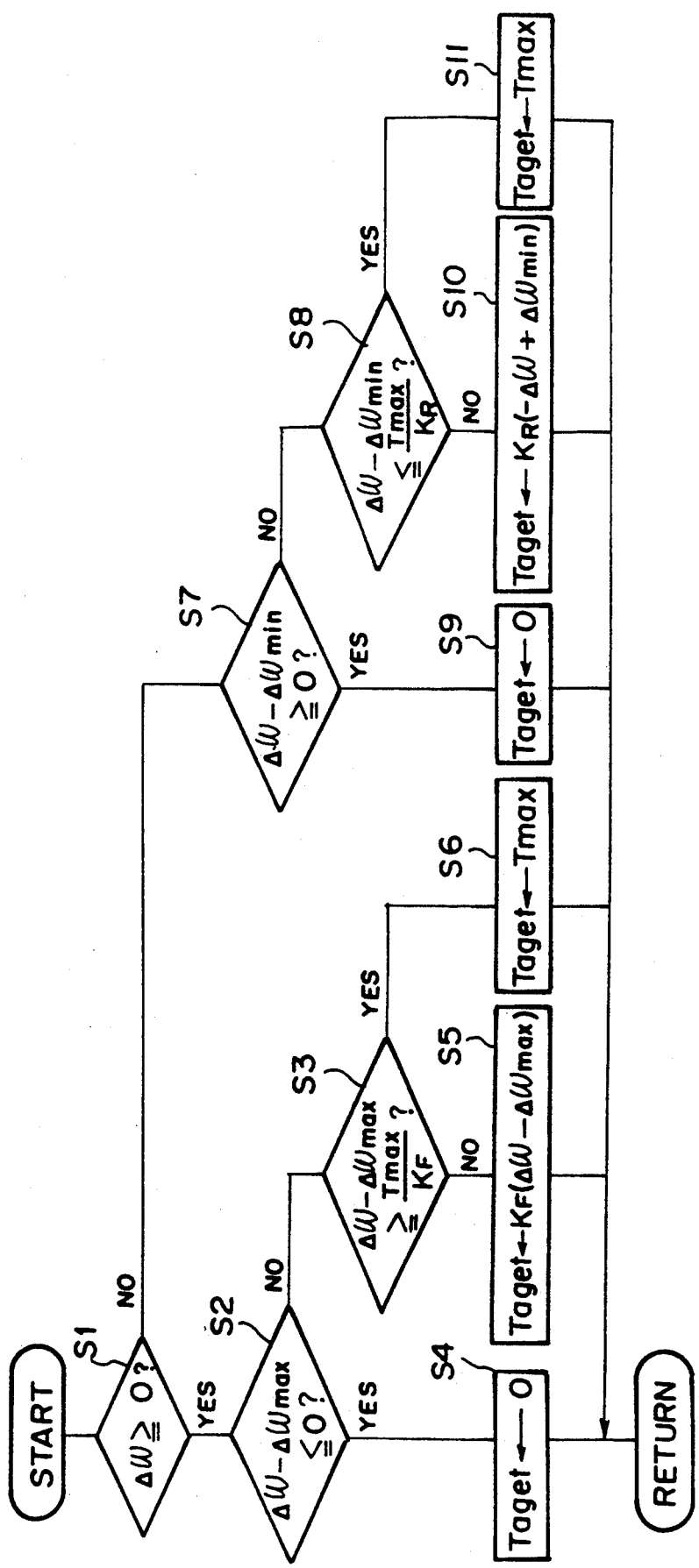
FIG. 6 is a flow chart of the target limitation degree determining routine.

In step #9, the torque split controller C1 executes a target limitation degree determining routine shown in FIG. 6 in which it determines the target value Taget of the degree of limitation on the basis of the front-higher gain $K_F$ and the rear-higher gain $K_R$ as will be described later.

In step #10, the torque split controller C1 outputs to the hydraulic pressure control valve 28 a controlled variable which corresponds to the target value Taget of the degree of limitation determined in step #9, thereby controlling the hydraulic pressure which acts on the wet clutch C and controlling the degree of limitation on the differential rotation of the front and rear wheels. Thereafter the torque split controller C1 returns to step #1.

When it is determined in step #5 that Br is ON, that is, when braking effect is acting on the vehicle WD, the torque split controller C1 executes a routine for the control during braking (steps #11 to #13).

In step #11, the torque split controller C1 determines whether the ABS signal from the ABS controller C2 is ON. The ABS controller C2 is for controlling an anti-lock brake system which may be of well known type and automatically maximizes the braking effect when the brake pedal is pushed down on a low 82 road surface.

When it is determined in step #11 that the ABS signal ABS is ON, that is, when the anti-lock brake system is operating, the torque split controller C1 proceeds to step #12 and sets the target value Taget of the degree of limitation to 0 since when the differential rotation of the front and rear wheels is limited the anti-lock brake system cannot operate correctly. Then the torque split controller C1 outputs in step #10 a controlled variable corresponding to the target value Taget (=0), and returns to step #1.

On the other hand, when it is determined in step #11 that the ABS signal ABS is not ON, that is, when the anti-lock brake system is not operating, the torque split controller C1 executes a routine for normal braking period control shown in FIG. 7 and calculates the front-higher gain $K_F$ and the rear-higher gain $K_R$ for the normal braking period control. Thereafter the torque split controller C1 proceeds to step #9 described above.

Now the tire abnormality detecting routine to be executed in step #6 will be described with reference to the flow chart shown in FIG. 3.

Basically, the torque split controller C1 determines that one or more of tires is not rotating regularly, i.e., is in an abnormal state, when the total of the times for which the variance in the rotational speeds of the four wheels is not smaller than a predetermined value (1.025) exceeds a predetermined value (0.25 seconds).

In step P1, the torque split controller C1 determines whether the steering angle $\theta$ is 0, that is, whether the vehicle is running straight.

When it is determined in step P1 that the steering angle $\theta$ is not 0, that is, when the vehicle is making a turn, variance in the rotational speeds of the four wheels is naturally produced. Accordingly, whether the tires are all in a normal state cannot be determined based on the variance in the rotational speeds. Therefore, during cornering, the torque split controller C1 immediately returns to the main routine and executes step #7.

On the other hand, when it is determined in step P1 that the steering angle $\theta$ is 0, the torque split controller C1 proceeds to step P2 and determines whether a first variance in the rotational speeds of the four wheels as defined in the following formula (2) is not smaller than 1.025.

$$(\omega FL + \omega RR)/(\omega FR + \omega RL) \quad (2)$$

When it is determined in step P2 that the first variance is smaller than 1.025, the torque split controller C1 further determines whether a second variance in the rotational speeds of the four wheels as defined in the following formula (3) is not smaller than 1.025. (step P3)

$$(\omega FR + \omega RL)/(\omega FL + \omega RR) \quad (3)$$

When it is determined in step P3 that the second variance is smaller than 1.025, that is, both the first variance and the second variance are smaller than 1.025, the torque split controller C1 determines that all the tires are in the normal state and returns to the main routine.

When it is determined in step P2 that the first variance is not smaller than 1.025, or when it is determined in step P3 that the second variance is not smaller than 1.025, the torque split controller C1 determines whether the total of the times for which the first or second variance is not smaller than 1.025 (will be referred to as "the duration of the variance", hereinbelow) has exceeded 0.25 seconds. ( steps P4 to P7)

Figure 8:
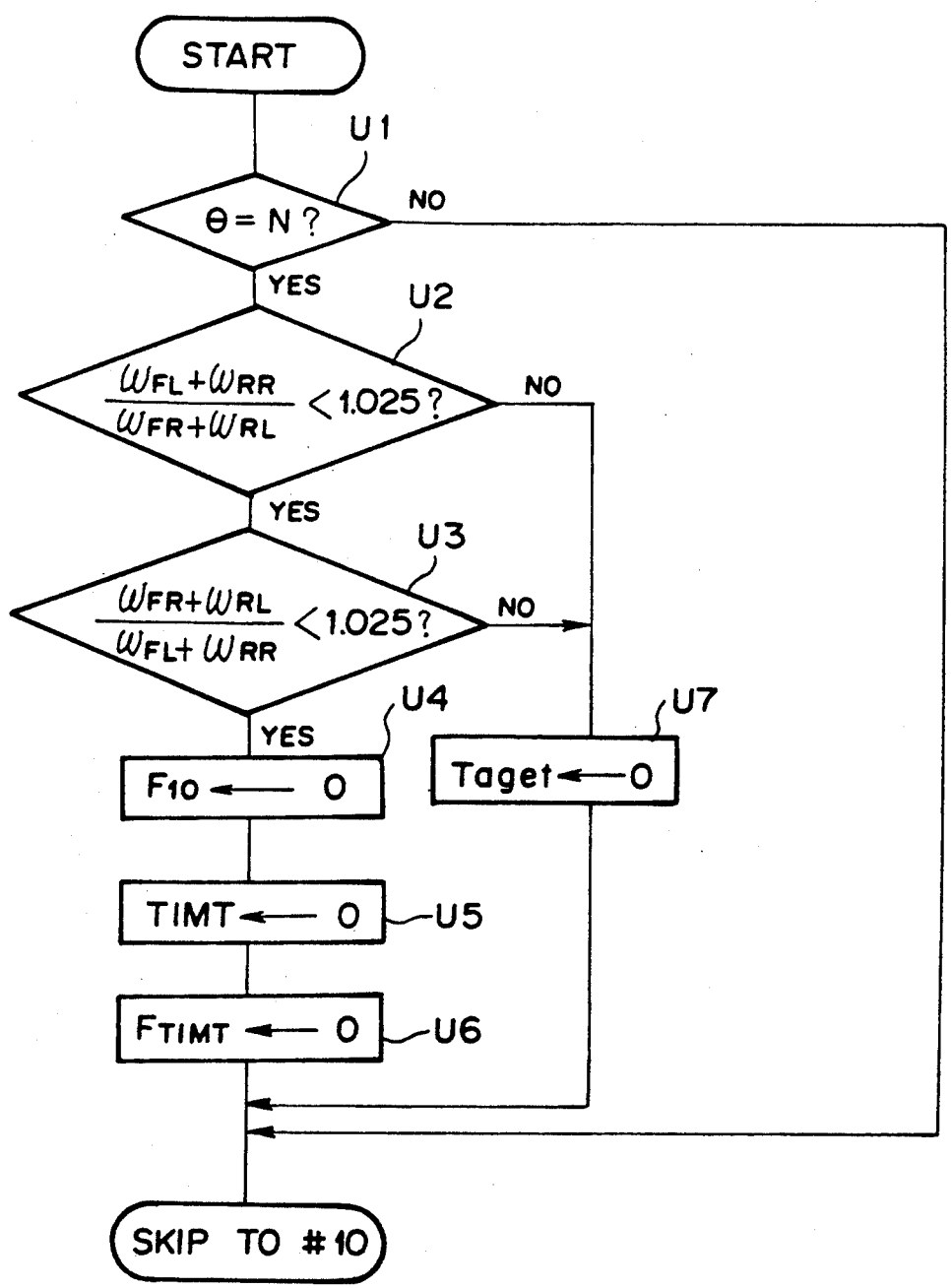
FIG. 8 is a flow chart of the tire abnormality correction determining routine.

In step P4, the torque split controller C1 determines whether timer flag $F_{TIMT}$ is 1. The timer flag $F_{TIMT}$ is initialized to 0, set to 1 when counter TIMT for timing the duration of the variance begins to count, and reset when it is determined that the abnormality of tires has been corrected through the tire abnormality correction determining routine (FIG. 8). When it is determined in step P4 that the timer flag $F_{TIMT}$ is not 1, the torque split controller C1 sets timer flag $F_{TIMT}$ to 1 in step P6.

On the other hand, when it is determined in step P4 that the timer flag $F_{TIMT}$ is 1, the torque split controller C1 determines whether the count of the counter TIMT has exceeded the value corresponding to 0.5 seconds. (step P5)

When it is determined in step P5 that the count of the counter TIMT has not exceeded the value corresponding to 0.5 seconds, the torque split controller C1 increments the counter TIMT by 1 and causes the counter TIMT to continue counting. ( step P7)

On the other hand, when it is determined in step P5 that the count of the counter TIMT has exceeded the value corresponding to 0.5 seconds, the torque split controller C1 determines that the tires are in an abnormal state, sets the flag F10 to 1 and sets the target value Taget of the degree of limitation to 0. (steps P8 and P9) Thereafter the torque split controller C1 returns to the main routine and executes step #10.

If the control of the degree of limitation on the differential rotation is carried out while the tires are in the abnormal state where the difference in rotational speed $\Delta\omega$ normally exists, the wet clutch C is normally held in half-engaged state, which deteriorates durability of the wet clutch C. In this embodiment, the target value Taget of the degree of limitation is set to 0 so that the control of the degree of limitation is not carried out when it is determined that the tires are in the abnormal state, thereby preventing deterioration of durability of the wet clutch C.

Now the failure detecting routine to be executed in step #7 will be described with reference to the flow chart shown in FIG. 4. Basically, in the failure detecting routine, the torque split controller C1 determines that the differential control system has failed when the difference in rotational speed $\Delta\omega$ is not reduced a predetermined time (1.5 seconds) after the target value Taget of the degree of limitation becomes not smaller than a predetermined value (A), that is, when the differential rotation is limited to relatively larger extent.

In step Q1, the torque split controller C1 determines whether time management flag $F_{FS}$ is 1. The time management flag $F_{FS}$ is initialized to 0 and set to 1 when the target value Taget of the degree of limitation becomes not smaller than the predetermined value (A). Then the time management flag $F_{FS}$ is reset when it is subsequently detected that the differential control system has not failed and the target value Taget of the degree of limitation subsequently becomes smaller than A.

When it is determined in step Q1 that the time management flag $F_{FS}$ is not 1, that is, when it is determined that the target value Taget has not become not smaller than the predetermined value A since it was detected last that the differential control system had not failed, the torque split controller C1 proceeds to step Q2 and determines whether the present target value Taget has is not smaller than the predetermined value A.

When it is determined in step Q2 that the former is smaller than the latter, the torque split controller C1 determines that the target value Taget is too small to determine whether the differential control system has failed and skips to step #8 of the main routine.

Otherwise, the torque split controller C1 proceeds to step Q3 and begins determining whether the differential control system has failed. In step Q3, the torque split controller C1 sets the time management flag $F_{FS}$ to 1.

Then in step Q4, the torque split controller C1 stores the present difference in rotational speed $\Delta\omega$ as a reference difference in rotational speed $\Delta\omega$Fail.

Then in step Q5, the torque split controller C1 increments time management timer TIMF by 1. The time management timer TIMF counts the time which lapses since the time management flag $F_{FS}$ is set to 1 and the determination of whether the differential control system has failed is began, and expires in 1.5 seconds. Thereafter the time management timer TIMF continues to count.

When it is determined in step Q1 that the time management flag $F_{FS}$ is 1, which indicates the determination of whether the differential control system has failed has been began, the torque split controller C1 determines in step Q6 whether the count of the timer TIMF has exceeded the value corresponding to 1.5 seconds, that is, whether the timer TIMF has expired.

When it is determined in step Q6 that the count of the timer TIMF has not exceeded the value corresponding to 1.5 seconds, the torque split controller C1 increments the timer TIMF by 1 and causes the timer TIMF to continue counting. ( step Q5)

Otherwise the torque split controller C1 determines whether the present difference in rotational speed $\Delta\omega$ is not smaller than the reference difference in rotational speed $\Delta\omega$Fail, that is, whether the difference in rotational speed $\Delta\omega$ is reduced in 1.5 seconds. (step Q7) When it is determined in step Q7 that the former is not smaller than the latter, the torque split controller C1 determines that the differential control system has failed. That is, that the difference in rotational speed $\Delta\omega$ is not nevertheless reduced in 1.5 seconds though the target value Taget is larger than the predetermined value A means that the limitation of the differential rotation is not effected in response to the output signal. In this case, the torque split controller C1 sets the target value Taget of the degree of limitation to 0 and sets a fail flag $F_{FAIL}$. (steps Q8 and Q9) Thereafter the torque split controller C1 returns to the main routine and executes step #10.

In this embodiment, the target value Taget of the degree of limitation is set to 0 so that the control of the degree of limitation is not carried out when it is determined that the differential control system has failed, thereby preventing improper limitation of the differential rotation from being carried out and improving reliability of the differential control system.

When it is determined in step Q7 that the present difference in rotational speed $\Delta\omega$ is smaller than the reference difference in rotational speed $\Delta\omega$Fail, the torque split controller C1 determines that the differential control system has not failed.

In this case, the torque split controller C1 determines in step Q10 whether the target value Taget is smaller than the predetermined value A. When it is determined that the former is smaller than the latter, the torque split controller C1 resets the time management flag $F_{FS}$ and resets the time management timer TIMF. (steps Q11 and Q12) Thereafter, the torque split controller C1 returns to the main routine and executes step #8. Otherwise, the torque split controller C1 skips the steps Q11 and Q12 and returns to the main routine. If the time management flag $F_{FS}$ and the time management timer TIMF are reset in this case, the time management timer TIMF will begin counting from the next run which results in a vain control action.

Figure 9:
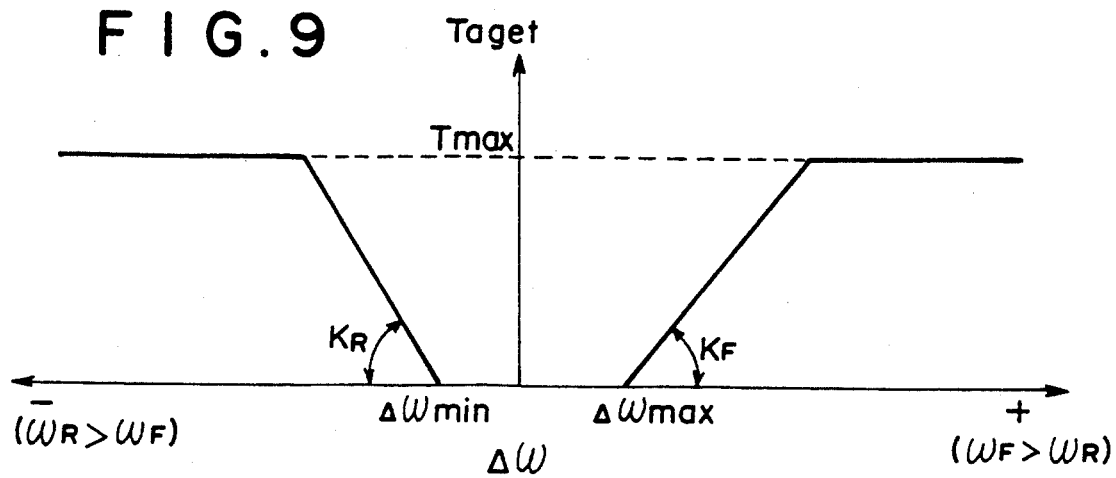
FIG. 9 is a view showing the relation between the target value of the degree of limitation and the difference in rotational speed between the front and rear wheels.

Now the normal running control routine to be executed in step #8 will be described with reference to the flow charts shown in FIGS. 5a to 5c. Basically, in the normal running control routine, the torque split controller C1 calculates various correction terms for various running conditions which will be described later, and calculates the front-higher gain $K_F$ and the rear-higher gain $K_R$ according to the following formulae (4) and (5) based on the corrections terms.

$$K_F = K_{fl} \times C_2 \times K_v \times K_{STR} \times K_\mu \qquad (4)$$

$$K_R = K_{rl} \times C_2 \times K_v \times K_{str} \times K_\mu \times K_{STRR} \qquad (5)$$

wherein $K_{fl}$ = weight correction term for the front-higher gain $K_F$ $K_{rl}$ = weight correction term for the rear higher gain $K_R$ $C_2$ = torque correction term $K_v$ = speed correction term $K_{str}$ = steering angle correction term $K_{STRR}$ = steering angular velocity correction term for the rear-higher gain $K_R$ $K_\mu$ = road surface friction coefficient correction term In this embodiment, basically, the target value Taget of the degree of limitation is expressed as a function of the difference in rotational speed $\Delta\omega$ between the front wheels and the rear wheels as shown in FIG. 9, and the target value Taget of the degree of limitation for the running condition range in which the rotational speed of the front wheels is higher than that of the rear wheels (difference in rotational speed $\Delta\omega > 0$) and that for the running condition range in which the latter is higher than the former (difference in rotational speed $\Delta\omega < 0$) are separately set. The running condition range in which the rotational speed of the front wheels is higher than that of the rear wheels will be referred to as "the front-higher range" and the running condition range in which the rotational speed of the rear wheels is higher than that of the front wheels will be referred to as "the rear-higher range", hereinbelow.

In the range within the front-higher range where the difference in rotational speed $\Delta\omega$ is not larger than the value $\Delta\omega$max at the front-higher range side intercept, the target value Taget of the degree of limitation is set to 0, whereby a front-higher range neutral zone is provided. In the range where the difference in rotational speed $\Delta\omega$ is larger than the value $\Delta\omega$max, the target value Taget of the degree of limitation is linearly increased up to an upper limit Tmax with a predetermined gain $K_F$ with increase in the difference in rotational speed $\Delta\omega$. When the target value Taget of the degree of limitation reaches the upper limit Tmax, the front drive shaft 7 and the rear drive shaft 8 are rigidly connected and the differential rotation of the front and rear wheels is completely prevented.

In the range within the rear-higher range where the difference in rotational speed $\Delta\omega$ is not smaller than the value $\Delta\omega$min at the rear-higher range side intercept, the target value Taget of the degree of limitation is set to 0, whereby a rear-higher range neutral zone is provided. In the range where the difference in rotational speed $\Delta\omega$ is smaller than the value $\Delta\omega$min, the target value Taget of the degree of limitation is linearly increased up to the upper limit Tmax with a predetermined gain $K_R$ with decrease in the difference in rotational speed $\Delta\omega$.

The relation between the target value Taget of the degree of limitation and the difference in rotational speed $\Delta\omega$ need not be limited to a function of first degree but may be a function of second or higher degree.

As will be described later, the front-higher gain $K_F$, the rear-higher gain $K_R$, $\Delta\omega$max and $\Delta\omega$min are changed according to the various running conditions of the vehicle WD so that the relation between the target value Taget of the degree of limitation and the difference in rotational speed $\Delta\omega$ conforms to the running condition of the vehicle WD, thereby improving the running stability, the reliability, the fuel economy and the like.

In steps R1 to R4, the torque split controller C1 calculates the weight correction term $K_{fl}$ for the front-higher gain $K_F$ (will be referred to as "the front-higher weight correction term $K_{fl}$", hereinbelow) and the Weight correction term $K_{rl}$ for the rear-higher gain $K_R$ (will be referred to as "the rear-higher weight correction term $K_{rl}$", hereinbelow).

Figure 10:
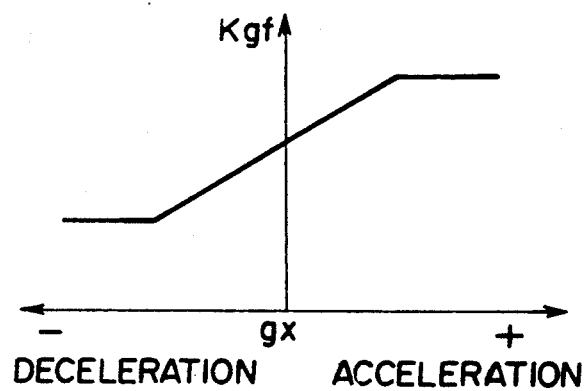
FIG. 10 is a view showing the relation between the acceleration correction value for the front-higher gain and the longitudinal acceleration.
Figure 11:
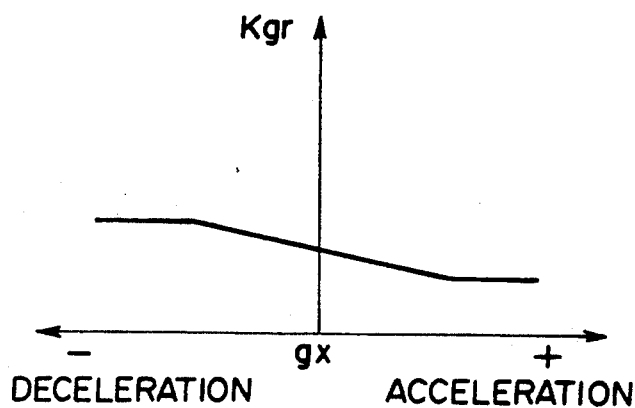
FIG. 11 is a view showing the relation between the acceleration correction value for the rear-higher gain and the longitudinal acceleration.

In step R1, the torque split controller C1 first calculates an acceleration correction value Kgf for the front-higher gain $K_F$ and an acceleration correction value Kgr for the rear-higher gain $K_R$ which are related to the longitudinal acceleration gx as shown in FIGS. 10 and 11, respectively. That is, during acceleration, the more the acceleration gx is, the less the load distribution to the front wheels is and the more apt to slip the front wheels are. Accordingly, the acceleration correction value Kgf is increased as the acceleration gx increases. On the other hand, the more the acceleration gx is, the more the load distribution to the rear wheels is and the less apt to slip the rear wheels are. Accordingly, the acceleration correction value Kgr is reduced as the acceleration gx increases. During deceleration, the more the deceleration $-gx$ is, the more the load distribution to the front wheels is and the less apt to slip the front wheels are. Accordingly, the acceleration correction value Kgf is reduced as the deceleration $-gx$ increases. On the other hand, during deceleration, the more the deceleration $-gx$ is, the less the load distribution to the rear wheels is and the more apt to slip the rear wheels are. Accordingly, the acceleration correction value Kgf is increased as the deceleration $-gx$ increases. Of course, the characteristics shown in FIGS. 10 and 11 are determined taking into account the load distribution to the front and rear wheels when the vehicle WD stops horizontally.

Figure 12:
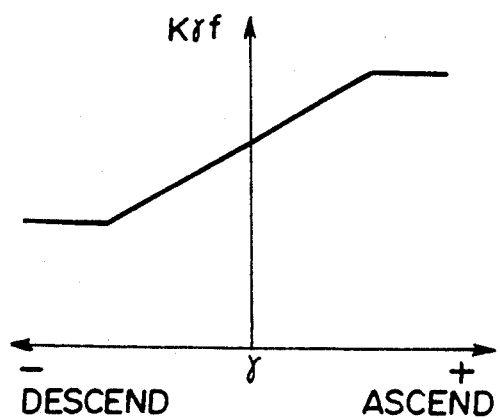
FIG. 12 is a view showing the relation between the inclination correction value for the front-higher gain and the incline of the road surface, FIG. 13 a view showing the relation between the inclination correction value for the rear-higher gain and the inclination of the road surface.
Figure 13:
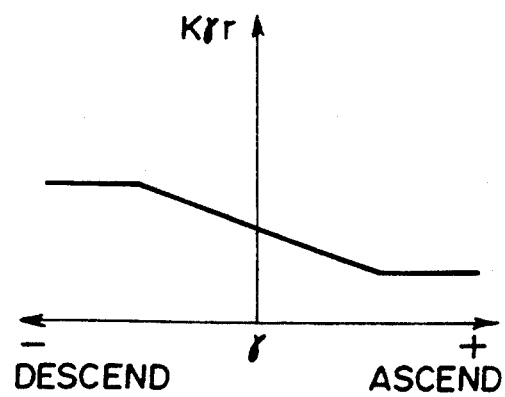

In step R2, the torque split controller C1 calculates an inclination correction value K$\gamma$f for the front-higher gain $K_F$ and an inclination correction value K$\gamma$r for the rear-higher gain $K_R$ which are related to the inclination $\gamma$ of the road surface (i.e., the inclination of the vehicle body) as shown in FIGS. 12 and 13, respectively. That is, during ascending a slope, the more the inclination $\gamma$ is, the less the load distribution to the front wheels is and the more apt to slip the front wheels are. Accordingly, the inclination correction value K$\gamma$f is increased as the inclination $\gamma$ increases. On the other hand, the more the inclination $\gamma$ is, the more the load distribution to the rear wheels is and the less apt to slip the rear wheels are. Accordingly, the inclination correction value K$\gamma$r is reduced as the inclination increases. During descending a slope, the more the descending inclination $-\gamma$ is, the more the load distribution to the front wheels is and the less apt to slip the front wheels are. Accordingly, the inclination correction value K$\gamma$f is reduced as the inclination $-\gamma$ increases. On the other hand, the more the descending inclination $-\gamma$ is, the less the load distribution to the rear wheels is and the more apt to slip the rear wheels are. Accordingly, the inclination correction value K$\gamma$r is increased as the inclination $\gamma$ increases.

In step R3, the torque split controller C1 adopts the larger one of the acceleration correction value Kgf and the inclination correction value K$\gamma$f as the front-higher weight correction term Kfl. Then in step R4, the torque split controller C1 adopts the larger one of the acceleration correction value Kgr and the inclination correction value K$\gamma$r as the rear-higher weight correction term Krl. The front-higher weight correction term Kfl and the rear-higher weight correction term Krl may be calculated on the basis of the acceleration correction value Kgf and the inclination correction value K$\gamma$f, and the acceleration correction value Kgr and the inclination a correction value K$\gamma$r in other manners. For example, the product or the average of the acceleration correction value Kgf and the inclination correction value K$\gamma$f or the acceleration correction value Kgr and the inclination correction value K$\gamma$r may be adopted as the front-higher weight correction term Kfl or the rear-higher weight correction term Krl.

The torque correction term C$_2$ is calculated in steps R5 to R9 or steps R11 to R15.

Figure 14:
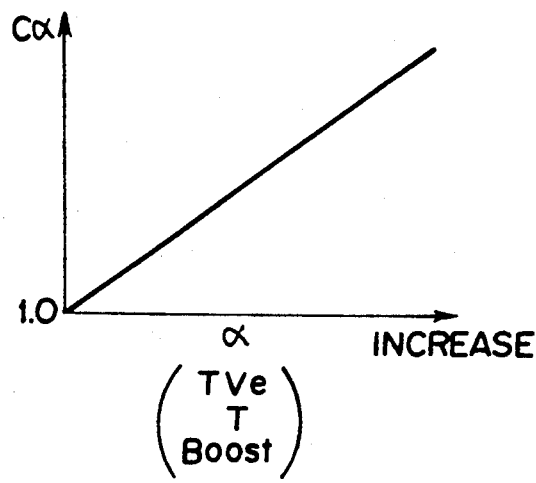
FIG. 14 is a view showing the relation between the engine load correction value and the engine load.

In step R5, the torque split controller C1 calculates an engine load correction value C$_a$ which is related to the engine load as shown in FIG. 14. That is, when the engine load is heavy, the wheel driving force is large and the wheel is more apt to slip. Accordingly, the engine load correction value C$_a$ is increased, thereby increasing the gains K$_F$ and K$_R$, as the engine load increases. The engine load may be represented, for instance, by the amount of depression u of the accelerator pedal, the throttle opening TV$\theta$, the power plant output torque T or the boost B.

Figure 15:
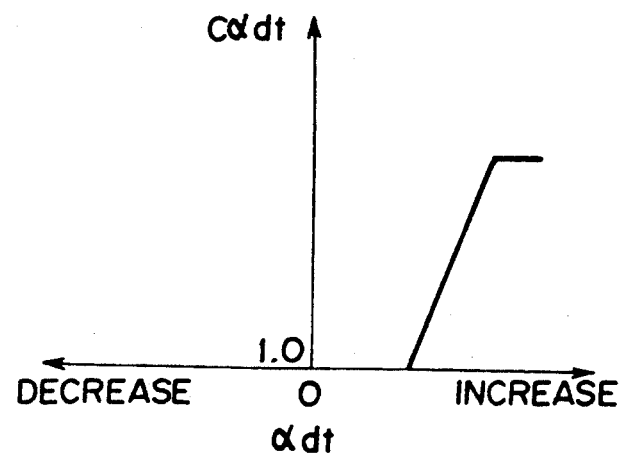
FIG. 15 is a view showing the relation between the engine load changing rate correction value and the rate of change of the engine load.

In step R6, the torque split controller C1 calculates an engine load changing rate correction value C$_{adt}$ which is related to the rate of change of the engine load udt as shown in FIG. 15. That is, when the rate of change of the engine load udt is large, it is expected that the engine load increases soon. Accordingly, when the rate of change of the engine load udt is large, the engine load changing rate correction value C$_{adt}$ is set large so that the gains K$_F$ and K$_R$ become large, thereby preventing slip of the wheels at high engine output power.

Then in step R7, the torque split controller C1 adopts the larger one of the engine load correction value C$_a$ and the engine load changing rate correction value C$_{adt}$ as an engine load correction value C1. The engine load correction value C$_1$ may be calculated on the basis of the engine load correction value C$_a$ and the engine load changing rate correction value C$_{adt}$ in other manners. For example, the product or the average of them may be adopted as the engine load correction value C$_1$.

In step R8, the torque split controller C1 calculates a gear position correction value C$_G$ which is related to the gear position GPOS as shown in FIG. 16. That is, when the torque ratio of the automatic transmission is larger, the tires are more apt to slip, and accordingly, the gear position correction value CG is increased with increase in the torque ratio.

In step R9, the torque split controller C1 calculates the torque correction term C$_2$ according to the following formula.

$$C_2 = C_1 \times C_G \quad (6)$$

Upon kick down, the automatic transmission downshifts and the output torque of the power plant P increases, whereby the tires become more apt to slip. Accordingly, the torque split controller C1 may be programmed to set the torque correction term C$_2$ to a value larger than 1 when kick-down is made as shown in steps R11 to R13. That is, in step R11, the torque split controller C1 determines whether the kick-down signal KDSW is ON. When it is determined in step R11 that the kick-down signal KDSW is ON, the torque split controller C1 sets the torque correction term C$_2$ to value B which is larger than 1. Otherwise, the torque split controller C1 sets the torque correction term C$_2$ to 1. (steps R12 and R13)

When the acceleration $\omega_{dt}$F of the front wheels or the acceleration $\omega_{dt}$R of the rear wheels exceeds a predetermined value, the tires become apt to slip. Accordingly, the torque split controller C1 may be programmed to set the torque correction term C$_2$ to a value larger than 1 as shown in steps R14 and R15. That is, in step R14, the torque split controller C1 calculates a wheel acceleration correction value K$\omega_{dt}$ which is related to the acceleration $\omega_{dt}$F of the front wheels and the acceleration $\omega_{dt}$R of the rear wheels as shown in FIG. 17. Then the torque split controller C1 sets the torque correction term C$_2$ to the wheel acceleration correction value K$\omega_{dt}$ in step R15.

The torque corrections based on the kick-down, and the acceleration of the wheels, and the torque correction shown in steps R5 to R9 may be selectively carried out or may be carried out in series. In the latter case, the product of the correction terms calculated in the respective torque corrections or the largest one of them may be adopted as the torque correction term C$_2$.

In step R10, the torque split controller C1 the speed correction term Kv. The vehicle speed V is calculated based on the rotational speed of the wheel whose rotational speed is the minimum min {$\omega$FL, $\omega$FR, $\omega$RL, $\omega$RR}. When giving weight to the running stability during straight travel, the speed correction term Kv is related to the vehicle speed V as shown by curve G1 in FIG. 18, and when giving weight to the fuel economy, it is related to the vehicle speed V as shown by curve G2 in FIG. 18.

In steps R 16 to R39, the torque split controller C1 calculates the steering angle correction term K$_{str}$ and the steering angular velocity correction term K$_{STRR}$ for the rear-higher gain K$_R$. In these steps, basically, the torque split controller C1 reduces the gain with increase in the steering angle $\theta$ irrespective of whether it is the front-higher gain K$_F$ or the rear higher gain K$_R$ in order to accommodate the difference in the rotational speed between the front and rear wheels since the steering angle $\theta$ is apt to become large in the low vehicle speed range. On the other hand, since the steering angle $\theta$ generally does not become large in the high vehicle speed range, the torque split controller C1 basically sets the steering angle correction term K$_{str}$ to 1 and reduces only the rear-higher gain K$_R$ as the rate of change with time of the steering angle $\theta$, i.e., the steering angular velocity $\theta_{dt}$, increases, thereby suppressing slip.

In step R16, the torque split controller C1 determines whether the vehicle speed is not higher than 20 Km/h.

When it is determined in step R16 that the vehicle speed is not higher than 20 Km/h, the torque split controller C1 proceeds to step R17 and executes the gain correction for the low vehicle speed range.

In step R17, the torque split controller C1 calculates the steering angle correction term $K_{str}$ which is related to the steering angle $\theta$ as shown in FIG. 19. That is, since as the steering angle $\theta$ becomes larger, the difference between the turning radius of the rear wheels and that of the front wheels becomes larger, the gains $K_F$ and $K_R$ are reduced in order to permit the differential rotation of the front and rear wheels and to prevent tight-corner braking.

Then in step R18, the torque split controller C1 sets the steering angular velocity correction term $K_{STRR}$ for the rear-higher gain $K_R$ to 1. That is, in the low vehicle speed range, reduction of the gains $K_F$ and $K_R$ with increase in the steering angle $\theta$ will suffice and it is not necessary to selectively correct the rear-higher gain $K_R$.

On the other hand, when it is determined in step R16 that the vehicle speed V is higher than 20 Km/h, the torque split controller C1 proceeds to step R19 and executes the gain correction for the high vehicle speed range.

In step R19, the torque split controller C1 determined whether the steering angle $\theta$ is 0.

When it is determined that the steering angle $\theta$ is not 0, which means that the vehicle is making a turn, the torque split controller C1 proceeds to step R20 and based on the steering angle $\theta$ and the corrects the gains steering angular velocity $\theta_{dt}$.

In step R20, the torque split controller C1 determines whether steering angular velocity flag F0 is 1. The steering angular velocity flag F0 is initialized to 0, set to 1 when the vehicle begins to turn, and reset when the vehicle completed the turn. When it is determined in step R20 that the steering angular velocity flag F0 is not 1, which means that vehicle which has traveled straight hitherto begins to make a turn, the torque split controller C1 calculates in steps R21 to R25 a maximum value $|\theta_{dt}|$max of the absolute value of the steering angular velocity $|\theta_{dt}|$ during a transient period of turn between the time the turn is began and the time the stationary state of the turn is obtained. As will be described in detail later, the steering angular velocity correction term $K_{STRR}$ for the rear-higher gain $K_R$ is increased stepwise at a predetermined rate up to the maximum value $|\theta_{dt}|$max.

In step R21, the torque split controller C1 determines whether the absolute value of the steering angular velocity $|\theta_{dt}|$ is larger than 0. When it is determined in step R21 that the former is larger than 0, which means that the vehicle is in the transient period of turn, the torque split controller C1 determines preceding value of the $|\theta_{dt}|$max. When it is determined hat the former is larger than the latter, the torque split controller C1 adopts the present value of the $|\theta_{dt}|$ as the $|\theta_{dt}|$max. (step R23)

Then in step R24, the torque split controller C1 sets the steering angular velocity correction term $K_{STRR}$ to 0. That is, when the rear wheels are rotating at a higher speed than the front wheels, the rotational speed of the rear wheels must be quickly reduced in order to conform the rotational speeds of the wheels to the difference in the turning radii. Accordingly, the gains are nullified so that the differential rotation of the front and rear wheels is permitted without limitation.

When the stationary state of the turn is obtained, the $|\theta_{dt}|$ becomes equal to 0, and accordingly, the torque split controller C1 proceeds to step R25 from step R21 and sets the steering angular velocity flag $F_\theta$ to 1.

When it is determined in step R20 that the steering angular velocity flag $F_\theta$ is 1, which means that the stationary state of the turn has been obtained, the torque split controller C1 calculates the steering angular velocity correction term $K_{STRR}$ for the rear-higher gain $K_R$ in steps R27 to R34.

In step R27, the torque split controller C1 determines whether set time flag $F_{ST}$ is 0. The set time flag $F_{ST}$ is a flag for indicating whether the rising characteristics of the steering angular velocity correction term $K_{STRR}$ with respect to time (the gain with respect to time) has been determined. The set time flag $F_{ST}$ is initialized to 0 and set to 1 in step R30 when the rising characteristics and the upper limit $K_{\theta dt}$ of the steering angular velocity correction term $K_{STRR}$ are determined in steps R28 and R29.

Figure 20:
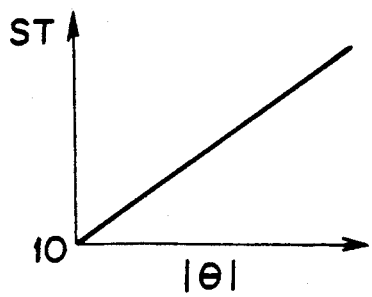
FIG. 20 is a view showing the relation between the set time and the absolute value of the steering angle.

When it is determined in step R27 that the set time flag $F_{ST}$ is 0, the torque split controller C1 determines set time ST for the steering angular velocity correction term $K_{STRR}$. (Step R28) The set time ST is related to the absolute value of the steering angle $|\theta|$ as shown in FIG. 20.

Figure 21:
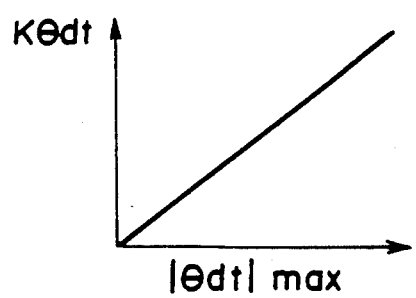
FIG. 21 is a view showing the relation between the steering angular velocity correction term and the maximum value of the absolute value of the steering angular velocity.

Then the torque split controller C1 calculates the upper limit $K_{\theta dt}$ of the steering angular velocity correction term $K_{STRR}$ which is related to $|\theta_{dt}|$max as Shown in FIG. 21. (step R29)

Then in step R30, the torque split controller C1 sets the set time flag $F_{ST}$ to 1.

In step R31, the torque split controller C1 adds 1/ST to rising characteristic correction value $K_{ST}$ each time it executes this step. That is, the rising characteristic correction value $K_{ST}$ is linearly increased with time.

The torque split controller C1 determines whether the rising characteristic correction value $K_{ST}$ is not smaller than 1, and sets it to 1 when the former is not smaller than 1. (steps R32 and R33) That is, the rising characteristic correction value $K_{ST}$ is linearly increased within 1. In step R34, the tsc calculates the steering angular velocity correction term $K_{STRR}$ according to the following formula.

$$K_{STRR} = K_{\theta dt} \times K_{ST} \qquad (7)$$

Then the torque split controller C1 proceeds to step R26.

Figure 22:
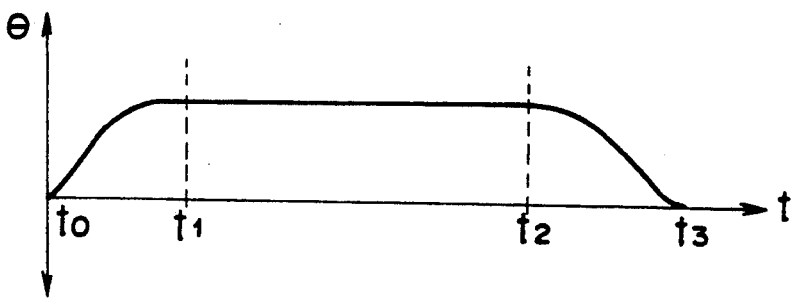
FIG. 22 is a view showing the change of the steering angle with time during cornering.
Figure 23:
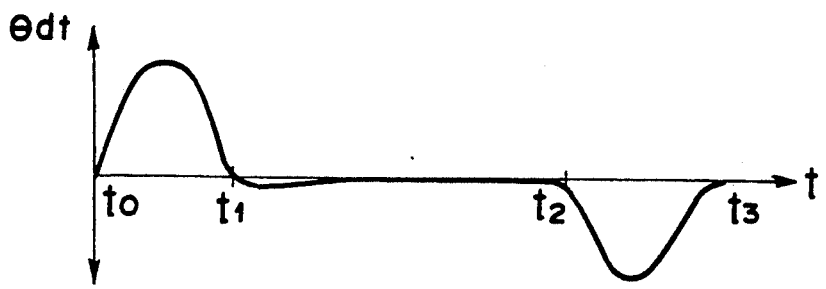
FIG. 23 is a view showing the characteristics of the steering angular velocity with respect to time.
Figure 24:
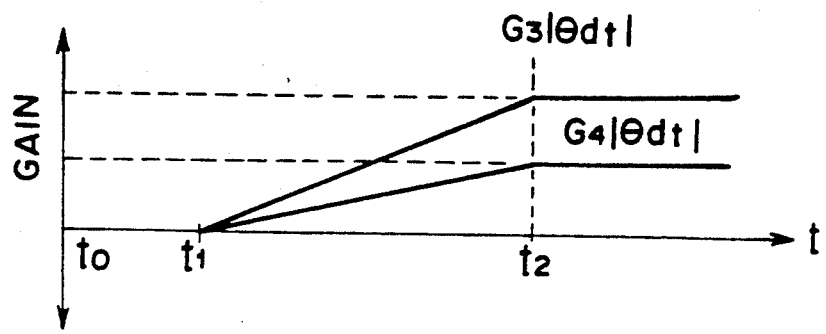
FIG. 24 is a view showing the change of the rear-higher gain with time during cornering.

For example, when, as shown in FIG. 22, the vehicle begins to making a turn at time $t_0$, reaches the stationary state of the turn at time $t_1$, begins to return to the straight running state at time $t_2$ and then completely returned to the straight running state at time $t_3$, the characteristics of the steering angular velocity $|\theta_{dt}|$ with respect to time are as shown in FIG. 23. When the gain correction by steps R27 to R34 is made for such a turn, the rear-higher gain $K_R$ changes with time as shown by line G3 in FIG. 24 in the case where the $|\theta_{dt}|$max is relatively large and as shown by line G4 in FIG. 24 in the case where the $|\theta_{dt}|$max is relatively small.

When it is determined in step R19 that the steering angle $\theta$ is 0, the vehicle is running straight and the gain correction based on the steering angle need not be made. Accordingly, the torque split controller C1 resets the $|\theta_{dt}|$max, the steering angular velocity flag $F_\theta$, the set time flag $F_{ST}$, the rising characteristic correction value $K_{ST}$ and the steering angular velocity correction term $K_{STRR}$ respectively in steps R35 to R39. Then the torque split controller C1 proceeds to step R26.

Figure 26:
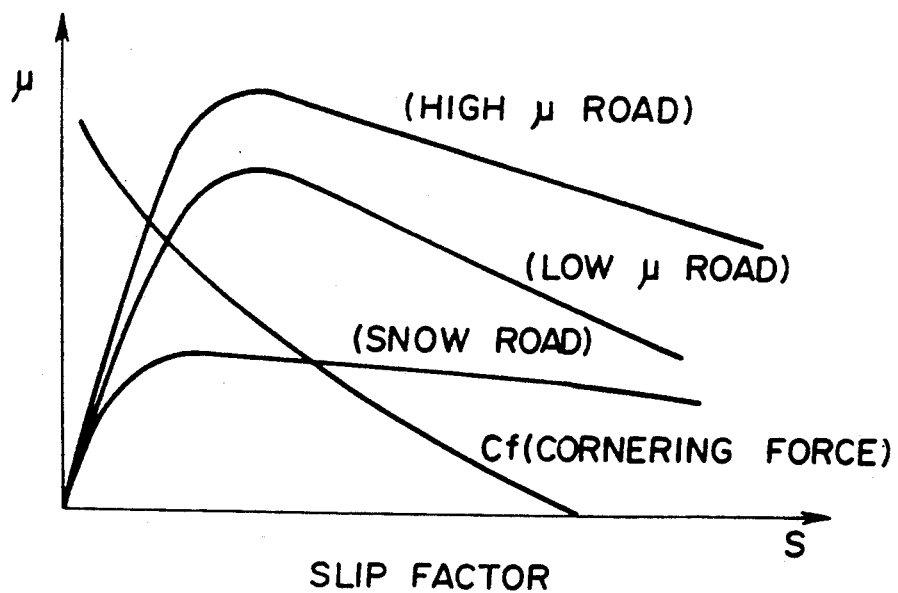
FIG. 26 is a view showing the relation between the road surface friction coefficient and the slip factor of the wheel.

In steps R41 to R49, the torque split controller C1 calculates the road surface friction coefficient correction term $K\mu$. As shown in FIG. 26, the road surface friction coefficient $\mu$ generally depends on the slip factor of the wheel and takes a maximum value $\mu$max at a certain slip factor. The maximum road surface friction coefficient $\mu$max is proportional to the maximum value gmax of the vehicle body acceleration g. Accordingly, here the torque split controller C1 calculates the maximum acceleration gmax at low vehicle speed heavy load, and calculates the road surface friction coefficient correction term $K\mu$ based on the maximum acceleration gmax obtained.

The torque split controller C1 determines whether the vehicle speed V is not higher than 10 Km/h and whether the amount of depression $\alpha$ of the accelerator pedal is larger than 50% respectively in steps R41 and R42.

When it is determined that the vehicle speed V is not smaller than 10Km/h and at the same time the amount of depression $\alpha$ of the accelerator pedal is larger than 50%, which means that the vehicle speed is low and the load is heavy, the torque split controller C1 calculates the maximum acceleration gmax in steps R43 to R47.

In step R43, the torque split controller C1 determines whether the road surface friction coefficient flag $F\mu$ is 1. The road surface friction coefficient flag $F\mu$ is initialized to 0, set to 1 when calculation of the maximum acceleration gmax starts and reset when calculation of the maximum acceleration gmax ends.

When it is determined in step R43 that the road surface friction coefficient flag $F\mu$ is not 1, the torque split controller C1 sets the maximum acceleration gmax to an initial value (0.1) and sets the road surface friction coefficient flag $F\mu$ to 1. (steps R46 and R47)

When it is determined in step R43 that the road surface friction coefficient flag $F\mu$ is 1, which means that the maximum acceleration gmax is being calculated, the torque split controller C1 determines whether the present value of g is larger than the preceding value of gmax, and when it is determined that the former is larger than the latter, the torque split controller C1 substitutes the present value of g for the value of gmax. (steps R44 and R45)

On the other hand, when it is determined that the vehicle speed is larger than 10 Km/h or it is determined that the amount of depression u of the accelerator pedal is not larger than 50%, the torque split controller C1 terminates calculation of gmax and resets the road surface friction coefficient flag $F\mu$ in step R48.

Figure 25:
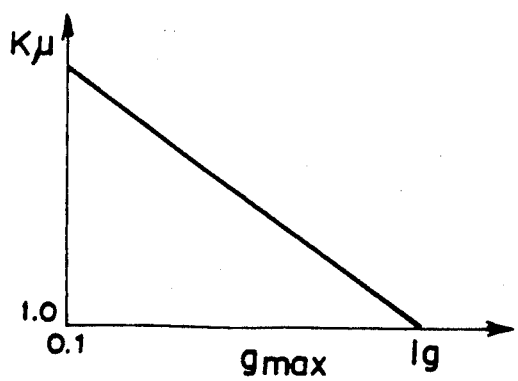
FIG. 25 is a view showing the relation between the road surface friction coefficient correction term and the maximum acceleration.

In step R49, the torque split controller C1 calculates the road surface friction coefficient correction term $K\mu$ based on the maximum acceleration gmax. The road surface friction coefficient correction term $K\mu$ is related to the maximum acceleration gmax as shown in FIG. 25. That is, when the maximum acceleration gmax is large, the tire are hard to slip and accordingly the road surface friction coefficient correction term $K\mu$ is reduced as the maximum acceleration gmax increases, thereby reducing the degree of limitation.

In steps R50 and R51, the torque split controller C1 calculates the front-higher gain $K_F$ and the rear-higher gain $K_R$ according to formulae (4) and (5), respectively.

Then the torque split controller C1 returns to the main routine and executes the target limitation degree determining routine (step #9).

Now the target limitation degree determining routine to be executed in step #9 will be described with reference to the flow chart shown in FIG. 6.

In step S1, the torque split controller C1 determines whether the difference in rotational speed $\Delta\omega$ is not smaller than 0, i.e., whether the running condition is in the front-higher range. When it is determined in step S1 that the former is not smaller than the latter, the torque split controller C1 calculates the target value Taget of the degree of limitation according to the characteristics for the front-higher range in steps S2 to S6.

In step S2, the torque split controller C1 determines whether $\Delta\omega - \Delta\omega$max is not larger than 0. When it is determined that $\Delta\omega - \Delta\omega$max is not larger than 0, the torque split controller C1 sets the target value Taget of the degree of limitation to 0 since the rotating condition of the wheels is in the front-higher range neutral zone.

When it is determined in step S2 that $\Delta\omega - \Delta\omega$max is larger than 0, the torque split controller C1 further determines in step S3 whether $\Delta\omega - \Delta\omega$max is not smaller than Tmax/$K_F$, i.e., whether the target value Taget of the degree of limitation has reached the upper limit Tmax.

When it is determined in step S3 that $\Delta\omega - \Delta\omega$max is smaller than Tmax/$K_F$, the torque split controller C1 calculates the target value Taget Of the degree of limitation according to the following formula.

$$\text{Taget} = K_F(\Delta 107 - \Delta\omega max) \qquad (8)$$

On the other hand, when it is determined in step S3 that $\Delta\omega - \Delta\omega$max is not smaller than Tmax/$K_F$, the target value Taget of the degree of limitation as calculated according formula (8) will exceed the upper limit Tmax and accordingly, the torque split controller C1 sets the target value Taget of the degree of limitation to the Tmax. (step S6)

When it is determined in step S1 that the difference in rotational speed $\Delta\omega$ is smaller than 0, the torque split controller C1 calculates the target value Taget of the degree of limitation according to the characteristics for the rear-higher range in steps S7 to S11.

In step S7, the torque split controller C1 determines whether $\Delta\omega - \Delta\omega$min is not larger than 0. When it is determined that $\Delta\omega - \Delta\omega$min is not larger than 0, the torque split controller C1 sets the target value Taget of the degree of limitation to 0 since the rotating condition of the wheels is in the rear-higher range neutral zone.

When it is determined in step S7 that $\Delta\omega - \Delta\omega$min is smaller than 0, the torque split controller C1 further determines in step S8 whether $\Delta\omega - \Delta\omega$min is not smaller than Tmax/$K_R$, i.e., whether the target value Taget of the degree of limitation has reached the upper limit Tmax.

When it is determined in step S8 that $\Delta\omega - \Delta\omega$min is larger than Tmax/$K_R$, the torque split controller C1 calculates the target value Taget of the degree of limitation according to the following formula.

$$\text{Taget} = K_R(\Delta\omega + \Delta\omega min) \qquad (9)$$

On the other hand, when it is determined in step S8 that $\Delta\omega - \Delta\omega$max is not larger than Tmax/$K_R$, the target value Taget of the degree of limitation as calculated according formula (9) will exceed the upper limit Tmax and accordingly, the torque split controller C1 sets the target value Taget of the degree of limitation to the Tmax. (step S11)

Now the normal braking period control routine to be executed in step #13 will be described with reference to the flow chart shown in FIG. 7.

In this routine, basically, the torque split controller C1 calculates correction terms which will be described later and calculates the front-higher gain $K_F$ and the rear higher gain $K_R$ for the normal braking period control according to the following formulae (10) and (11) based on the correction terms calculated.

$$K_F = K_{BF} \times K_{BSTR} \quad (10)$$

$$K_R = K_{BR} \times K_{BSTR} \quad (11)$$

wherein $K_{BF}$ represents a braking correction term for the front-higher gain $K_F$, $K_{BR}$ represents a braking correction term for the rear-higher gain $K_R$, and $K_{BSTR}$ represents a steering angle correction term during braking.

Figure 27:
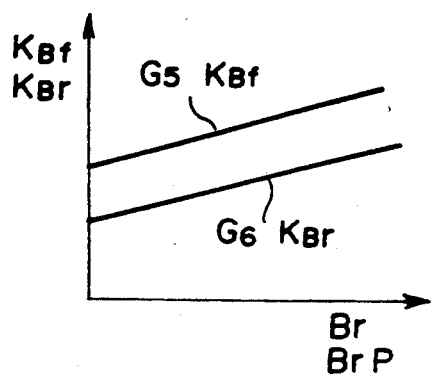
FIG. 27 is a view showing the relation between the braking correction terms and the amount of depression of the brake pedal (brake fluid pressure)

In step T1, the torque split controller C1 calculates the correction terms $K_{BF}$ and $K_{BR}$ which are respectively related to the amount of depression Br of the brake pedal as shown by line G5 and G6 in FIG. 27. That is, when the amount of depression Br of the brake pedal (the braking force) is large, the braking torque is distributed to the wheels, thereby preventing locking. On the other hand, when the amount of depression Br of the brake pedal (the braking force) is small, the differential rotation of the wheels is permitted more freely to ensure running stability. Brake fluid pressure BrP may be employed instead of the amount of depression Br of the brake pedal.

Figure 28:
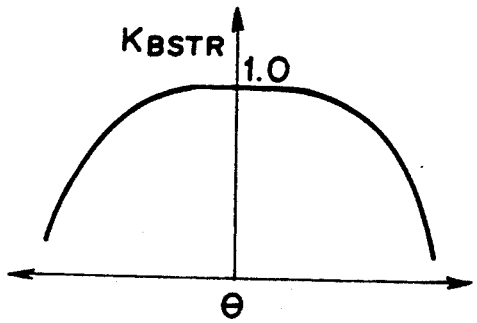
FIG. 28 is a view showing the relation between the steering angle correction term and the steering angle during normal braking.

In step T2, the torque split controller C1 calculates the steering angle correction term during braking $K_{BSTR}$ which is related to the steering angle $\theta$ as shown in FIG. 28. That is, as the steering angle $\theta$ increases, the gains are reduced so that the differential rotation of the wheels is permitted more freely to ensure running stability.

In step T3, the torque split controller C1 calculates the front-higher gain $K_F$ and the rear-higher gain $K_R$ for the normal braking period control according to formulae (10) and (11) described above.

The degree of limitation should be increased in order to prevent locking when the amount of depression Br of the brake pedal (the braking force) is large as described above. Though in steps T1 to T4, the degree of limitation is increased by increasing the gains $K_F$ and $K_R$, it may be increased by correcting $\Delta\omega$max and $\Delta\omega$min as in steps T5 to T8.

Figure 29:
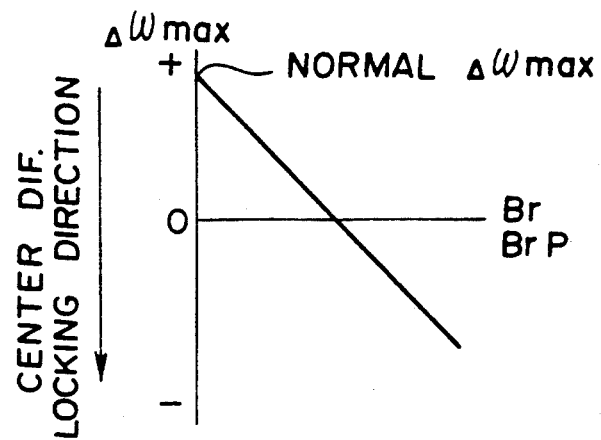
FIG. 29 is a view showing the characteristics of the front-higher range side intercept $\Delta\omega max$ with respect to the amount of depression of the brake pedal according to which the front-higher range side intercept $\Delta\omega max$ is corrected.
Figure 30:
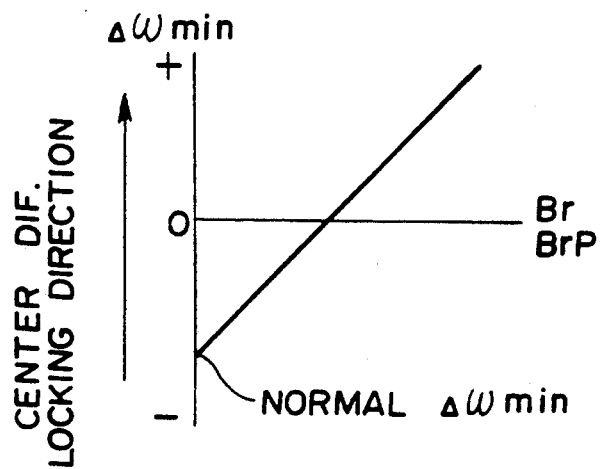
FIG. 30 is a view showing the characteristics of the rear-higher range side intercept $\Delta\omega min$ with respect to the amount of depression of the brake pedal according to which the rear-higher range side intercept $\Delta\omega min$ is corrected.

In this case, the torque split controller C1 corrects $\Delta\omega$max according to the characteristics shown in FIG. 29 in which $\Delta\omega$max is related to the amount of depression Br of the brake pedal. (step T5) Then the torque split controller C1 corrects $\Delta\omega$min according to the characteristics shown in FIG. 30 in which $\Delta\omega$min is related to the amount of depression Br of the brake pedal. (step T6)

Figure 31:
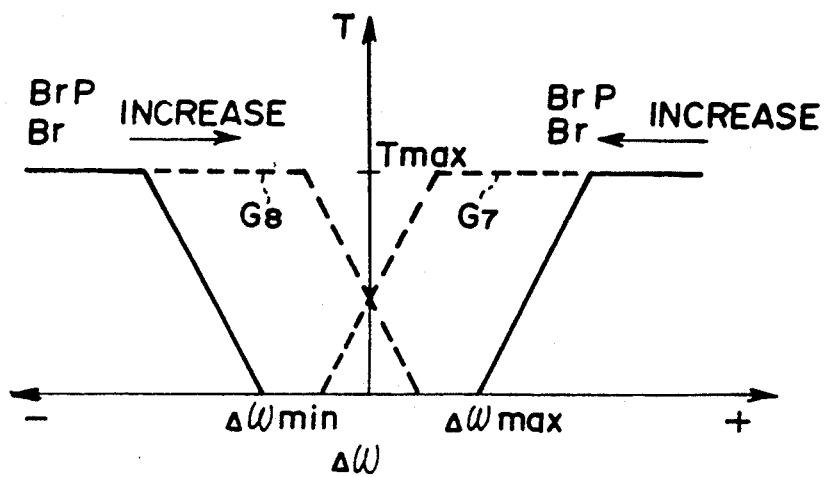
FIG. 31 is a view showing the relation between the target value of the degree of limitation and the difference in rotational speed when $\Delta\omega max$ and $\Delta\omega min$ are corrected according to the characteristics shown in FIGS. 29 and 30.

When $\Delta\omega$max and $\Delta\omega$min are corrected in this manner, the relation between the target value Taget of the degree of limitation and the difference in rotational speed $\Delta\omega$ becomes as shown by broken lines G7 and G8 in FIG. 31.

In step T7, the torque split controller C1 adopts the gain K which corresponds to the actual difference in rotational speed $\Delta\omega$ based on the corrected characteristics of $\Delta\omega$max (broken line G7) as the front-higher gain $K_F$.

In step T8, the torque split controller C1 adopts the gain K which corresponds to the actual difference in rotational speed $\Delta\omega$ based on the corrected characteristics of $\Delta\omega$min (broken line G8) as the rear-higher gain $K_R$.

The routine represented by steps T1 to T4 and the routine represented by steps T5 to T8 may be selectively carried out or both of them may be carried out in series.

Now the tire abnormality correction determining routine to be executed in step #14 will be described with reference to the flow chart shown in FIG. 8.

Basically, the torque split controller C1 determines that all the tires rotate in a regular state and the abnormal state of the tires has been corrected when the variance in the rotational speeds of the four wheels becomes smaller than a predetermined value (1.025).

In step U1, the torque split controller C1 determines whether the steering angle $\theta$ is 0, that is, whether the vehicle is running straight.

When it is determined in step U1 that the steering angle $\theta$ is not 0, that is, when the vehicle is making a turn, variance in the rotational speeds of the four wheels is naturally produced. Accordingly, whether the tires are all in a normal state cannot be determined based on the variance in the rotational speeds. Therefore, during cornering, the torque split controller C1 immediately returns to the main routine and executes step #10.

On the other hand, when it is determined in step U1 that the steering angle $\theta$ is 0, the torque split controller C1 proceeds to step U2 and determines whether the first variance in the rotational speeds of the four wheels $(\omega L + \omega RR)/(\omega FR + \omega RL)$ is smaller than 1.025.

When it is determined in step U2 that the first variance is smaller than 1.025, the torque split controller C1 further determines whether a second variance in the rotational speeds of the four wheels $(\omega FR + \omega RL)/(\omega FL + \omega RR)$ is smaller than 1.025. (step U3)

When it is determined in step U3 that the second variance is smaller than 1.025, that is, both the first variance and the second variance are smaller than 1.025, the torque split controller C1 determines that all the tires are in the normal state and the abnormal state of the tires has been corrected. The torque split controller C1 resets the flag F10, the counter TIMT and the timer flag $F_{TIMT}$ in steps U4 to U6, respectively. The torque split controller C1 returns to the main routine and executes step #10.

When it is determined in step U2 that the first variance is not smaller than 1.025, or when it is determined in step P3 that the second variance is not smaller than 1.025, the torque split controller C1 determines that the tires are still in the abnormal state and returns to step #10 in the main routine after setting the target value Taget of the degree of limitation to 0. in step U7.

We claim:

1. A differential control system for a four-wheel drive vehicle having a center differential which transmits the output torque of a power plant to both front and rear wheels to permit the front and rear wheels to rotate at different speeds, said differential control system comprising a rotational speed detecting means which detects the rotational speeds of the front and rear wheels of the vehicle and a differential rotation limit means for limiting the differential rotation of the front and rear wheels to a degree which is determined stronger according to an increase in a difference in rotational speed between the front and rear wheels;

wherein the degree of limitation on the differential rotation of the wheels is determined according to the difference in rotational speed between the front and rear wheels based on a first set of characteristics when the rotational speed of the front wheels is higher than that of the rear wheels and based on a second set of characteristics when the rotational speed of the rear wheels is higher than that of the front wheels, the first and second characteristics being set separately from each other.

2. A differential control system as defined in claim 1 in which said first and second characteristics are set according to a weight distribution to the front and rear wheels.

3. A differential control system as defined in claim 1 in which said first and second characteristics are set according to an acceleration and a deceleration of the vehicle.

4. A differential control system as defined in claim 1 in which said first and second characteristics are set according to an inclination of slope which the vehicle is ascending or descending.

5. A differential control system as defined in claim 1 in which said first and second characteristics are set according to a steering angle.

6. A differential control system as defined in claim 1 in which said first and second characteristics are set according to a rate of change with time of a steering angle.

7. A differential control system as defined in claim 1 in which said first and second characteristics are set according to a braking force.

8. A differential control system as defined in claim 1 in which said first and second characteristics are linear functions and a gradient of said first characteristics is greater than that of said second characteristics when the rotational speed of the front wheels is greater than that of the rear wheels.

* * * * *